United States Patent
Akselrod et al.

(10) Patent No.: US 11,429,008 B1
(45) Date of Patent: Aug. 30, 2022

(54) LIQUID CRYSTAL METASURFACES WITH CROSS-BACKPLANE OPTICAL REFLECTORS

(71) Applicant: Lumotive, LLC, Redmond, WA (US)

(72) Inventors: Gleb M. Akselrod, Kenmore, WA (US); Erik Edward Josberger, Renton, WA (US); Mark C. Weidman, Redmond, WA (US); Prasad Padmanabha Iyer, Albuquerque, NM (US)

(73) Assignee: Lumotive, LLC, Redmond, WA (US)

( * ) Notice: Subject to any disclaimer, the term of this patent is extended or adjusted under 35 U.S.C. 154(b) by 0 days.

(21) Appl. No.: 17/685,621

(22) Filed: Mar. 3, 2022

(51) Int. Cl.
  *G02F 1/29* (2006.01)
(52) U.S. Cl.
  CPC ........ *G02F 1/292* (2013.01); *G02F 2201/346* (2013.01); *G02F 2203/24* (2013.01)
(58) Field of Classification Search
  CPC ...... G02F 1/29; G02F 1/292; G02F 2201/346; G02F 2203/24; H01Q 3/26; H01Q 3/30; H01Q 3/34; H01Q 3/36; H01Q 3/40
  USPC ................. 349/113, 114, 155, 156, 201, 202
  See application file for complete search history.

(56) References Cited

U.S. PATENT DOCUMENTS

| | | |
|---|---|---|
| 6,844,946 B2 | 1/2005 | Buse |
| 9,040,428 B2 | 5/2015 | Hong et al. |
| 9,104,086 B1 | 8/2015 | Davids |
| 9,195,052 B2 | 11/2015 | Long et al. |

(Continued)

FOREIGN PATENT DOCUMENTS

| | | |
|---|---|---|
| CN | 113614570 A | 11/2021 |
| EP | 3942334 A1 | 1/2022 |

(Continued)

OTHER PUBLICATIONS

Arbabi, et al., Dielectric Metasurfaces for Complete Control of Phase and Polarization with Subwavelength Spatial Resolution and High Transmission, arXiv:1411.1494v2 [physics.optics], Sep. 4, 2015, pp. 1-27.

(Continued)

*Primary Examiner* — Edward J Glick
*Assistant Examiner* — David Y Chung
(74) *Attorney, Agent, or Firm* — Phillips Winchester; Justin K. Flanagan

(57) ABSTRACT

According to various embodiments, a tunable optical metasurface includes an array of elongated resonator rails arranged parallel to one another. Liquid crystal is positioned within an optical field region between adjacent resonator rails. A controller can selectively apply a voltage differential pattern to the elongated resonator rails to adjust a phase response thereof. According to various embodiments, a cross-backplane reflector is utilized that allows for mid-array routing or edge-array routing of electrical connections between the controller and the resonator rails. The cross-backplane reflector comprises a plurality of elongated optical reflectors extending parallel to one another and perpendicular to the array of resonator rails. An optically transmissive (e.g., transparent) dielectric may electrically separate the resonator rails from the optical reflectors. A pattern of vias formed therein facilitates electrical connections between the optical reflectors and the resonator rails.

27 Claims, 17 Drawing Sheets

(56) References Cited

U.S. PATENT DOCUMENTS

| | | |
|---|---|---|
| 9,476,981 B2 | 10/2016 | Yaacobi |
| 9,804,329 B2 | 10/2017 | Montazeri et al. |
| 9,935,375 B2 | 4/2018 | Bowers |
| 9,946,076 B2 | 4/2018 | Smits |
| 10,199,415 B2 | 2/2019 | Akselrod |
| 10,254,448 B2 | 4/2019 | Lee |
| 10,303,038 B2 | 5/2019 | Kim et al. |
| 10,332,923 B2 | 6/2019 | Josberger |
| 10,451,800 B2 | 10/2019 | Akselrod |
| 10,468,447 B2 | 11/2019 | Akselrod et al. |
| 10,627,571 B1 | 4/2020 | Akselrod |
| 10,665,953 B1 | 5/2020 | Akselrod et al. |
| 10,670,782 B2 | 6/2020 | Arbabi et al. |
| 10,720,712 B2 | 7/2020 | Foo |
| 10,816,939 B1 | 10/2020 | Coleman |
| 11,005,186 B2 | 5/2021 | Akselrod et al. |
| 11,092,675 B2 | 8/2021 | Akselrod et al. |
| 2002/0081445 A1 | 6/2002 | Kadomura et al. |
| 2003/0174940 A1 | 9/2003 | Charlton et al. |
| 2004/0037497 A1 | 2/2004 | Lee |
| 2004/0125266 A1 | 7/2004 | Miyauchi et al. |
| 2005/0117866 A1 | 6/2005 | Park et al. |
| 2006/0202125 A1 | 9/2006 | Suhami |
| 2006/0239688 A1 | 10/2006 | Hillis et al. |
| 2006/0284187 A1 | 12/2006 | Wierer, Jr. et al. |
| 2007/0013983 A1 | 1/2007 | Kitamura et al. |
| 2009/0067774 A1 | 3/2009 | Magnusson |
| 2010/0156573 A1 | 6/2010 | Smith |
| 2011/0134496 A1 | 6/2011 | Tompkin et al. |
| 2011/0244613 A1 | 10/2011 | Heck et al. |
| 2012/0194399 A1 | 8/2012 | Bily et al. |
| 2012/0267694 A1 | 10/2012 | Kaiser et al. |
| 2013/0129293 A1 | 5/2013 | Ogawa et al. |
| 2013/0286633 A1 | 10/2013 | Rodriguez |
| 2014/0038320 A1 | 2/2014 | Wang |
| 2014/0085693 A1 | 3/2014 | Mosallaei et al. |
| 2014/0266946 A1 | 9/2014 | Bily et al. |
| 2014/0294338 A1 | 10/2014 | Long |
| 2015/0036198 A1 | 2/2015 | Inokuchi |
| 2015/0162658 A1 | 6/2015 | Bowers et al. |
| 2015/0318618 A1 | 11/2015 | Chen et al. |
| 2015/0318620 A1 | 11/2015 | Black et al. |
| 2015/0372389 A1 | 12/2015 | Chen et al. |
| 2015/0380828 A1 | 12/2015 | Black et al. |
| 2017/0030773 A1 | 2/2017 | Han et al. |
| 2017/0153528 A1 | 6/2017 | Kim et al. |
| 2017/0212285 A1 | 7/2017 | Arbabi |
| 2018/0047774 A1 | 2/2018 | Garreau et al. |
| 2018/0076521 A1 | 3/2018 | Mehdipour et al. |
| 2018/0138576 A1 | 5/2018 | Cohen |
| 2018/0239021 A1 | 8/2018 | Akselrod |
| 2018/0239213 A1 | 8/2018 | Akselrod |
| 2018/0241131 A1* | 8/2018 | Akselrod ................. H01Q 3/44 |
| 2018/0248267 A1 | 8/2018 | Akselrod |
| 2019/0006533 A1 | 1/2019 | Goldan et al. |
| 2019/0243208 A1 | 8/2019 | Peng et al. |
| 2019/0252441 A1 | 8/2019 | Akselrod |
| 2019/0260124 A1 | 8/2019 | Davoyan |
| 2019/0285798 A1* | 9/2019 | Akselrod ............... G02B 5/008 |
| 2019/0294104 A1 | 9/2019 | Rho et al. |
| 2019/0377084 A1 | 12/2019 | Sieasman et al. |
| 2020/0303826 A1 | 9/2020 | Akselrod et al. |
| 2020/0303827 A1 | 9/2020 | Akselrod et al. |
| 2021/0141060 A1 | 5/2021 | Akselrod et al. |
| 2022/0043117 A1 | 2/2022 | Akselrod et al. |

FOREIGN PATENT DOCUMENTS

| | | |
|---|---|---|
| JP | 2005345402 A | 12/2015 |
| WO | 2018039455 A1 | 3/2018 |
| WO | 2018156643 | 8/2018 |
| WO | 2018156688 | 8/2018 |
| WO | 2018156793 | 8/2018 |
| WO | 2018210776 | 11/2018 |
| WO | 2019191778 A1 | 10/2019 |
| WO | 2020190704 A1 | 9/2020 |
| WO | 2021167657 A2 | 8/2021 |

OTHER PUBLICATIONS

Lumotive, LLC, International Patent Application No. PCT/US20/22599, International Search Report and Written Opinion dated Jul. 23, 2020, 12 pp.

Askelrod, U.S. Appl. No. 17/098,213, Non-Final Office Action dated Jan. 25, 2021, pp. 1-19.

"Unique" Definition, Meriam-Webster, downloaded Jan. 15, 2021 from https://www.merriam-webster.com/dictionary/unique, 9 pages (Year:2021).

Derickson et al., Self-Mode Locking of a Semiconductor Laser Using Positive Feedback, Feb. 1990, Applied Physics Letters, https://www.researchgate. net/publication/224422317_Self-Mode-Locking_of_a_Semiconductor_Laser_Using_Positive_Feedback>, pp. 7-9.

Lumotive, International Patent Application No. PCT/US20/60601, International Search Report and Written Opinion dated Sep. 9, 2021, 9 pp.

Huang et al., "Gate-tunable conducting oxide metasurfaces," Nano Lett. 16, 5319 (2016).

Pors, Bozhevolnyi, "Plasmonic metasurfaces for efficient phase control in reflection," Opt. Express 21, 27438 (2013).

Arbabi et al., "Subwavelength-thick lenses with high numerical apertures and large efficiency based on high contrast transmitarrays," Nat. Commun. 6, 1 (2014).

Haffner et al., "All-plasmonic Mach-Zehnder modulator enabling optical high-speed communication at the microscale." Nat. Photonics 9, 525-528 (2015).

Li et al., "Poling efficiency enhancement of tethered binary nonlinear optical chromophores for achieving an ultrahigh n3r33 figure-of-merit of 2601 pm V?1" J. Mater. Chem. C 3, 6737-6744 (2015).

Zhang et al., "High performance optical modulator based on electro-optic polymer filled silicon slot photonic crystal waveguide," J. Light. Technol. 34, 2941-2951 (2016).

Xing et al., "Digitally controlled phase shifter using an SOI slot waveguide with liquid crystal infiltration," 27, 1269-1272 (2015).

Borshch et al., "Nanosecond electro-optic switching of a liquid crystal," Phys. Rev. Lett. 111, 107802 (2013).

Chen et al., "Ultra-low viscosity liquid crystal materials," Opt. Mater. Express 5, 655 (2015).

Gholipour et al., "An all-optical, non-volatile, bidirectional, phase-change meta-switch," Adv. Mater. 25, 3050 (2013).

Raoux et al., "Phase change materials and phase change memory," MRS Bull. 39, 703 (2014).

Rios et al., "Integrated all-photonic non-volatile multi-level memory," Nat. Photonics 9, 725 (2015).

International Application No. PCT/US2018/019107, International Search Report dated Jun. 25, 2018; pp. 1-3.

International Application No. PCT/US2019/022935, International Search Report dated Jul. 4, 2019; pp. 1-5.

U.S. Appl. No. 15/900,676, Requirement for Restriction/Election dated Jun. 25, 2020, pp. 1-7.

Funkhouser, T. et al., 'Survey of Methods for Modeling Sound Propagation in Interactive Virtual Environment Systems,' Princeton University, Department of Computer Science, 2003, pp. 1-53.

U.S. Appl. No. 15/924,744, Non-Final Office Action dated Feb. 15, 2019, pp. 1-11.

U.S. Appl. No. 16/357,288 Non-Final Office Action dated Oct. 7, 2020, pp. 1-8.

Wang, et al., A 60GHz Passive Repeater Array with Endfire Radiation Based on Metal Groove Unit-Cells, 9th European Conference on Antennas and Propagation (EuCAP2015), Apr. 2015, Lisbon, Portugal, 5 pp.

* cited by examiner

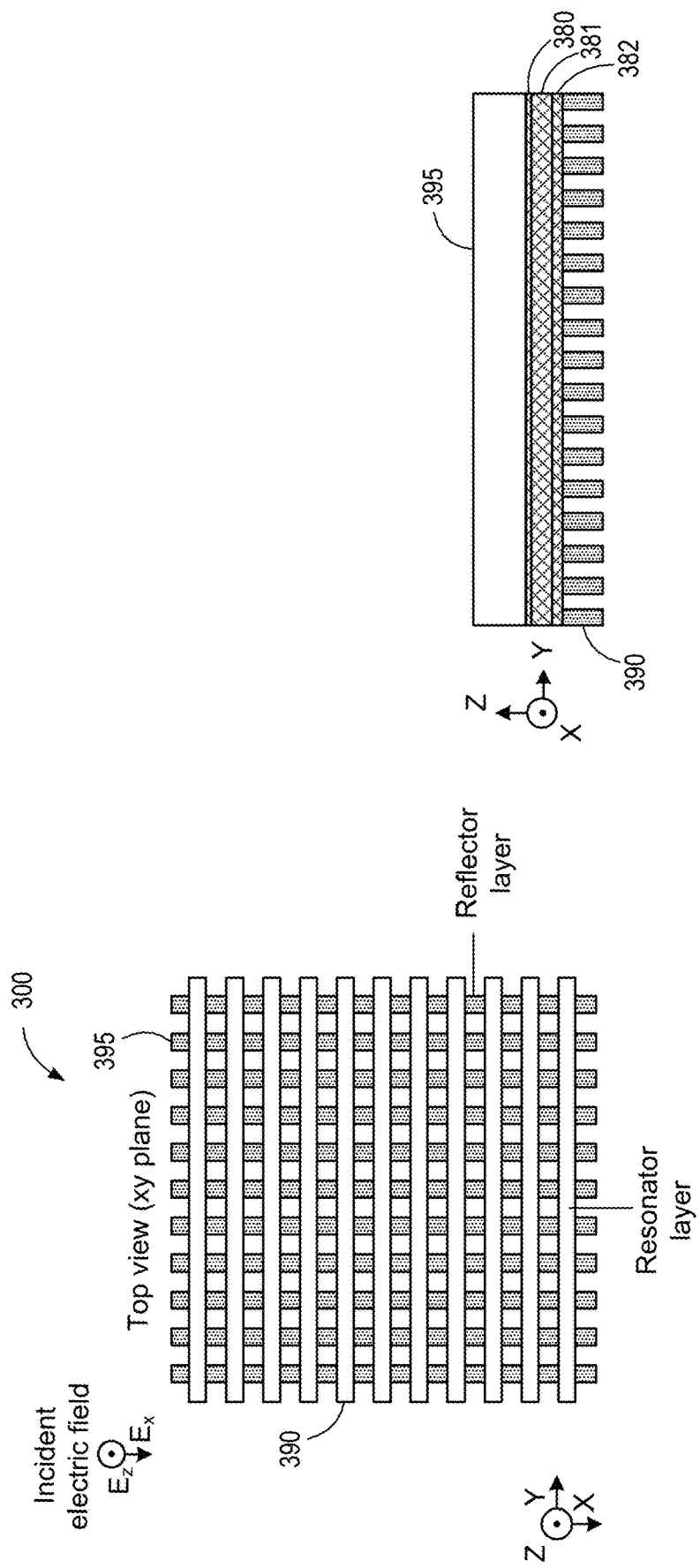

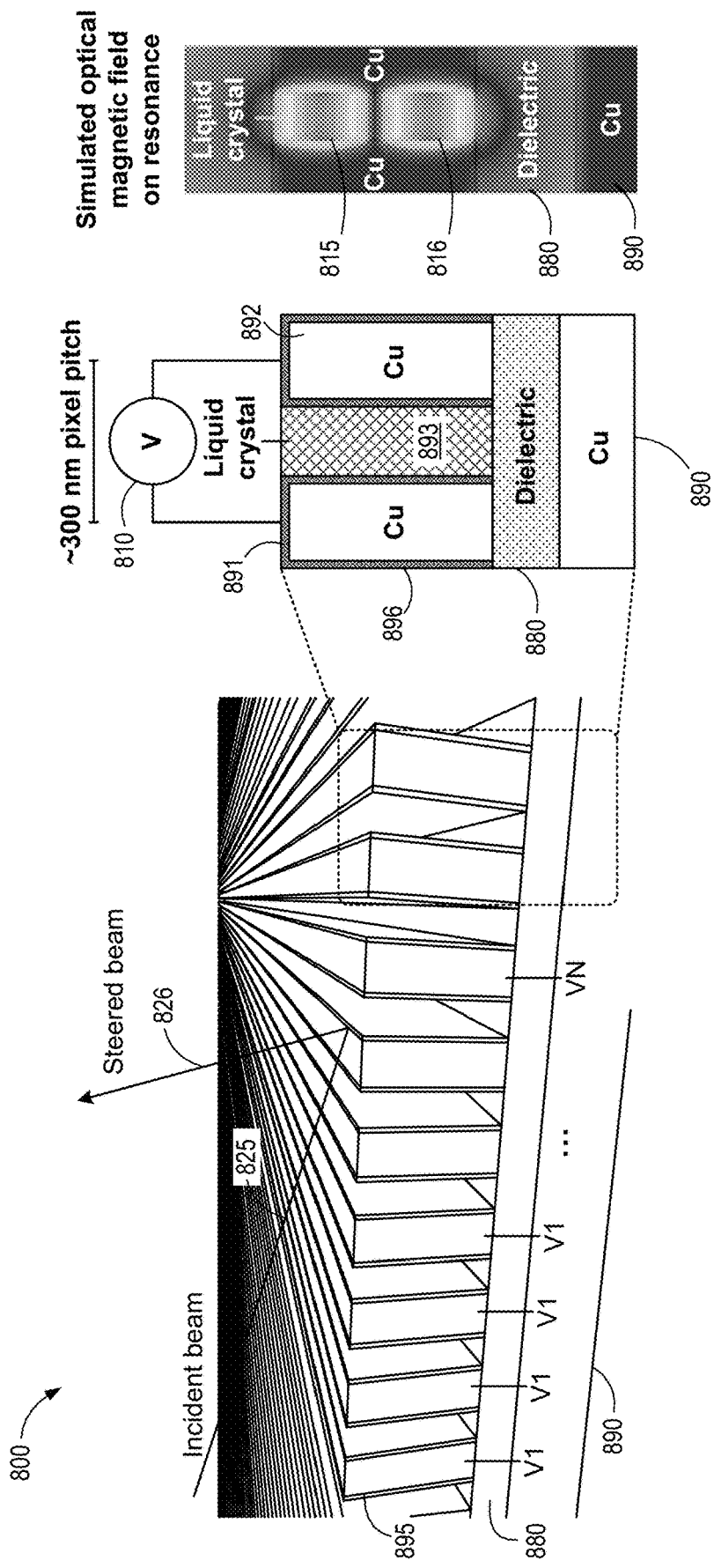

OFF

ON

LIQUID CRYSTAL METASURFACES WITH CROSS-BACKPLANE OPTICAL REFLECTORS

TECHNICAL FIELD

This disclosure relates to optical resonators and antennas. Specifically, this disclosure relates to tunable, optically reflective metasurfaces.

BRIEF DESCRIPTION OF THE DRAWINGS

FIG. 3C illustrates a top view of the parallel resonator rails arranged on the cross-backplane reflector similar to that of FIG. 3A, but rotated 90-degrees, according to one embodiment.

FIG. 3D illustrates another side view of the parallel reflector elements of the cross-backplane reflector, according to one embodiment.

FIG. 8A illustrates a perspective view of the perpendicular rails of an LCM extending from a reflective surface, according to one embodiment.

FIG. 8B illustrates an optically reflective copper surface covered with an insulating layer and metal rails extending therefrom with liquid crystal therebetween, according to one embodiment.

FIG. 8C illustrates a simulated optical magnetic field of resonance between two adjacent rails extending from an optically reflective copper surface, according to one embodiment.

DETAILED DESCRIPTION

Figure 1A:
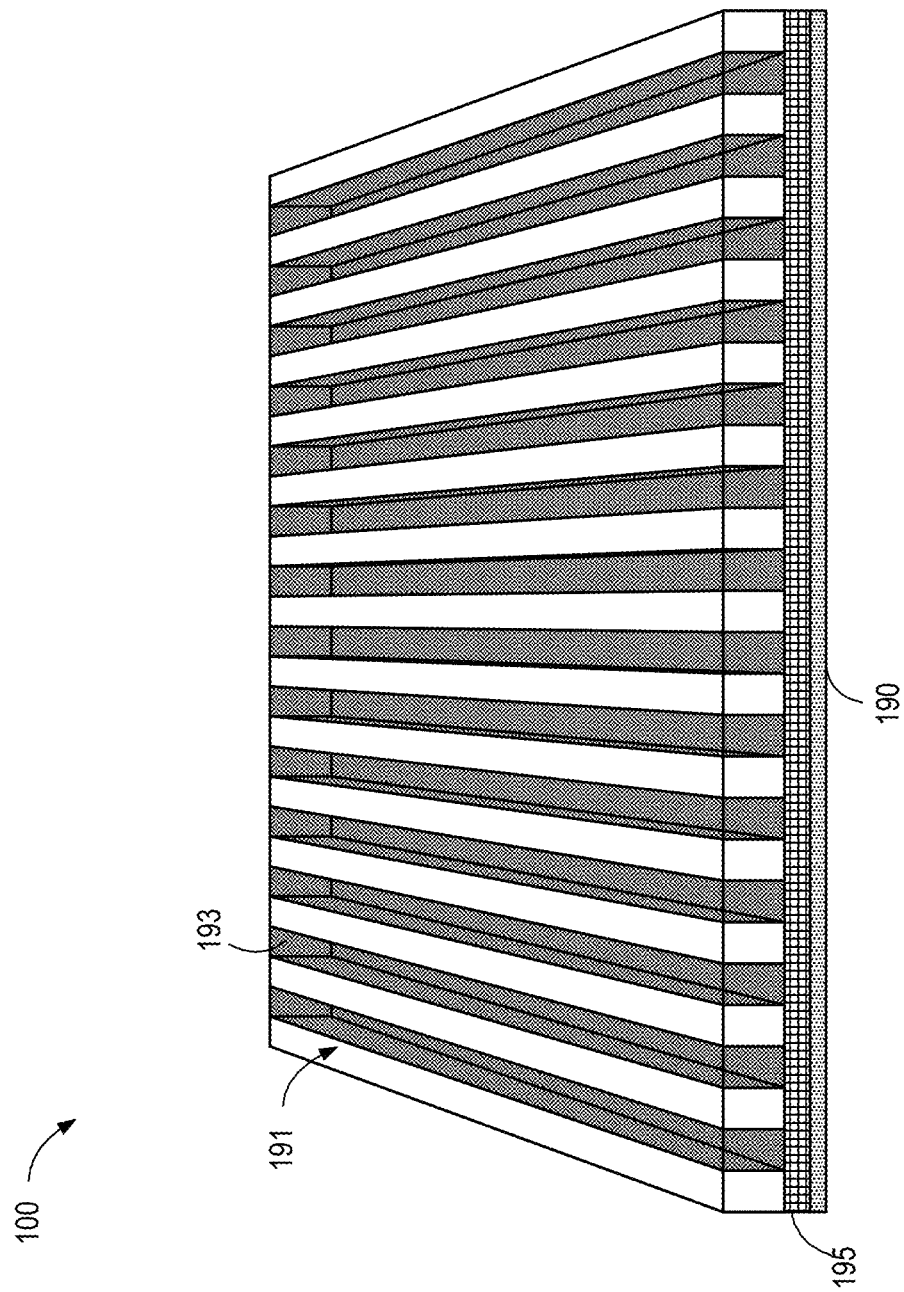
FIG. 1A illustrates an example of a tunable liquid crystal metasurface (LCM), according to one embodiment.

Tunable optical metasurfaces may be used for beamforming, including three-dimensional beam shaping, two-dimensional beam steering, and one-dimensional beam steering. In various embodiments, a tunable optical metasurface includes an array of elongated resonator rails arranged parallel to one another on a first planar surface of an optically transmissive dielectric (e.g., optically transparent). Liquid crystal is positioned within an optical field region between each of the adjacent resonator rails. For example, the liquid crystal may fill the channels between the resonator rails and, in some embodiments, form a layer of liquid crystal above the rails. The liquid crystal may be deposited between the resonator rails and secured via an optically transparent cover (e.g., glass). Other dielectric materials with an electrically tunable refractive index may also be positioned between the rails, such as electro-optic polymers or chalcogenide glasses, among others. Accordingly, while many of the embodiments described herein refer to liquid crystal, it is understood that similar embodiments are contemplated using alternative refractive index tunable dielectric materials.

The presently described systems and methods include various embodiments of cross-backplane reflector layers under a resonator layer. The cross-backplane reflector layers comprise a plurality of elongated optical reflectors that facilitate discrete electrical connections and via formations, as detailed herein. For example, a cross-backplane reflector may comprise a plurality of elongated optical reflectors extending parallel to one another and perpendicular to the array of resonator rails. The cross-backplane reflector and the resonator rails may be separated by a dielectric layer to provide electrical insulation therebetween. Stated another way, the cross-backplane reflector and the resonator rails may be positioned on opposing planar surfaces of an optically transmissive dielectric layer.

As described herein, a plurality of vias may be patterned in the optically transmissive dielectric at locations between adjacent optical reflectors in the cross-backplane reflector. A controller may apply a voltage to each of the resonator rails via electrical connections therebetween. In some embodiments, the electrical connections may comprise wires, traces, or other conductive elements that extend from the resonator rails through vias in the optically transmissive dielectric and then between adjacent elongated optical reflectors of the cross-backplane reflector to the controller which is integrated on the same substrate underneath the reflector layer or connected externally to the metasurface substrate. In other embodiments, each of the resonator rails may be connected to one or more of the elongated optical reflectors of the cross-backplane reflector. The controller may apply a voltage differential pattern to the resonator rails by applying a corresponding voltage to the electrically connected elongated optical reflectors of the cross-backplane reflector.

The presently described systems and methods include cross-backplane reflector configurations in which the vias for electrical connection to the resonator rails are patterned in the middle of an active portion of the metasurface (a mid-array routing configuration). The presently described systems and methods include cross-backplane reflector configuration in which the vias for electrical connection to the resonator rails are patterned on edge regions outside of the active portion of the metasurface (an edge-array routing configuration).

As described herein, a controller may selectively apply patterns of voltage differentials between adjacent resonator rails to generate corresponding reflection phase patterns for selective beam steering. Depending on the electrical connection configuration utilized, a metasurface may include a plurality of vias patterned in the optically transmissive dielectric at locations between adjacent optical reflectors in the cross-backplane reflector. The control lines connecting the controller to the resonator rails may be routed as part of the cross-backplane reflector and through the plurality of vias in the optically transmissive dielectric. In this way, the reflector layer functions as both an optical reflector under the resonators and as the voltage routing layer. This enables a large optical aperture to be tiled with repeating sets of resonators. In such embodiments, the controller may apply a non-zero bias voltage to the optical reflectors in the cross-backplane reflector, since the optical reflectors are not themselves serving as part of the electrical connection between the controller and the resonator rails.

As described herein, the resonator rails may be embodied as metal rails or doped dielectric or semiconductor rails. Examples of suitable metal rails include, but are not limited to, metal rails comprising one or more of aluminum, gold, copper, silver, platinum, titanium, chromium, tantalum, tantalum nitride, titanium nitride, molybdenum, cobalt, and tungsten. Similarly, the optical reflector rails of the cross-backplane reflector element may comprise or consist of one or more of aluminum, gold, copper, silver, platinum, titanium, chromium, tantalum, tantalum nitride, titanium nitride, molybdenum, cobalt, and tungsten. In some embodiments, the optical reflector rails include diffusion barriers that comprise tantalum, tantalum nitride, and titanium nitride. The resonator rails may be spaced apart from one another by less than one-half of a wavelength within an operational bandwidth. Similarly, the optical reflectors of the cross-backplane reflector may also be spaced from one another by less than one-half of a wavelength within the operational bandwidth. In other embodiments, the optical reflectors of the cross-backplane reflector are spaced from one another by more than one-half of a wavelength within the operational bandwidth. In embodiments in which the cross-backplane has optical reflectors with dimensions on the order of the wavelength of light, the cross-backplane structure behaves like a mirror to the p-polarized light (as defined by the plane of incidence (see, e.g., FIG. 2B). The electric field of the light that penetrates the resonator and is incident on the reflector is parallel to the walls of the reflector rails and so the structure acts like a good reflector.

A tunable optical metasurface may utilize a cross-backplane reflector configuration referred to as a "mid-array routing" configuration in which vias for electrical connections between the optical reflectors of the cross-backplane reflector and the resonator rails are patterned in a diagonal or flag stripe within the active region of the metasurface. In other embodiments, a tunable optical metasurface may utilize a cross-backplane reflector with vias in an "edge-array routing" configuration in which vias for electrical connections are patterned outside of the active region of the metasurface. In both arrangements, a set of distinct voltage signals are connected to many resonator rails in a tiled fashion, such that a single voltage is connected to a single resonator rail in each tile. If the number of distinct voltage lines is large is sufficient to cover the whole optical aperture, no tiling is required.

In edge-array routing configurations, the elongated resonator rails are arranged parallel to one another and extend from a first edge of the active area to a second edge of the active area, and beyond the second edge of the active area into a first routing area that is outside of the active area. A cross-backplane conductor may include a plurality of elongated conductors that extend parallel to one another and perpendicular to the resonator rails. The cross-backplane conductors may be optical reflectors, similar to those described in mid-array routing configurations. In other embodiments, the cross-backplane conductors are not reflective within the routing area(s). In edge-array routing configurations, an optically reflective surface or layer beneath the resonator rails may be formed as a single two-dimensional surface (e.g., a sheet or layer of metal), as a cross-backplane reflector of optical reflectors, or as a distributed Bragg reflector (DBR) that includes a plurality of layers of dielectrics with different indices of refraction.

In some edge-array routing configurations, as illustrated and described in greater detail below, each resonator rail further extends beyond the first edge of the active area into a second routing area that is outside of the active area. A second cross-backplane conductor within the second routing area may include a second plurality of elongated conductors extending parallel to one another and perpendicular to the resonator rails.

The voltage differential applied between two rails forming the optical resonator determines the orientation angle of the liquid crystals, which changes the phase delay that the incident light experiences at corresponding locations on the surface. The set of voltages applied to the resonator within one tile of resonators determines the properties of the diffracted beam from the tunable metasurface. When all the resonators are off (the voltages are all zero or equal to each other), the metasurface acts as a mirror and the angle of the outgoing beam is equal to the incident beam. To steer the incident beam to a desired angle, a periodic pattern of voltages is applied such that a blazed diffraction pattern is coded across the surface. The period of the encoded diffraction pattern determines the angle of the outgoing (diffracted beam). Other modulation patterns that are not periodic within a tile can be applied to steer the light to multiple directions or to perform lensing or other optical functions beyond beam steering of plane waves. If the number of control voltages is large enough such that tiling is not required, the metasurface can perform arbitrary optical functions.

Copper is an example of a metal suitable and cost-effective for use in manufacturing the resonator rails and/or the optical reflectors. Copper is suitable for use with infrared bandwidths that are utilized for light detection and ranging, or LiDAR, such as 905-nanometer LiDAR systems and 1550-nanometer LiDAR systems, or for optical communications. Copper may also be used for a variety of other operational wavelengths. Alternative metals (e.g., gold, silver, aluminum, etc.) and various dielectrics and metal-coated dielectrics are known to be highly reflective at various wavelengths and may be employed in metasurfaces configured for operation at other wavelengths. Copper and aluminum are preferred metals to form the rails as they are commonly used as interconnects in integrated circuit manufacturing.

Various combinations of the embodiments and features described above may be used as part of a solid-state light detection and ranging (LiDAR) transmitter, receiver, or transceiver system. The transceiver system, according to various embodiments, may include a first tunable, optically reflective metasurface for transmitting the light and a second tunable, optically reflective metasurface for receiving light reflected by distant objects (rebounded light). The distance to the distant objects can be calculated by measuring the time-of-flight of the transmitted and rebounded light. Each of the optically reflective metasurfaces includes an optically reflective surface (or reflective layered surface) with an array (e.g., two-dimensional or one-dimensional array) of sub-wavelength, optical resonant antennas. Voltage bias patterns applied to liquid crystal associated with the optical resonator rails modify the local reflection phases thereof. A controller may selectively apply a voltage pattern to attain a target beam steering angle.

The LiDAR system may utilize a laser diode light source for transmissions, such as a laser diode emitting optical radiation at standardized wavelengths of 905 nanometers or 1550 nanometers. Various other wavelengths may be utilized with the systems and methods described herein, including visible wavelengths, sub-infrared wavelengths, and infrared wavelengths. The LiDAR system may include a receiver to reflect rebounded optical radiation to a receiving sensor (such as an avalanche photodiode array) from a target steering angle or beam shape (e.g., corresponding to the transmitted steering angle). The presently described systems and methods may be utilized in alternative applications other than LiDAR that make use of optical beam steering.

It is appreciated that the metasurface technologies described herein may incorporate or otherwise leverage prior advancements in surface scattering antennas, such as those described in U.S. Patent Publication No. 2012/0194399, which publication is hereby incorporated by reference in its entirety. Additional elements, applications, and features of surface scattering antennas that feature a reference wave or feed wave are described in U.S. Patent Publication Nos. 2014/0266946, 2015/0318618, 2015/0318620, 2015/0380828, 2015/0162658, and 2015/0372389, each of which is hereby incorporated by reference in its entirety. Specific descriptions of optical resonant antenna configurations and feature sizes are described in U.S. patent application Ser. Nos. 15/900,676, 15/900,683, and 15/924,744, each of which is hereby incorporated by reference in its entirety.

Throughout this disclosure, examples of transmitting (or receiving) embodiments are provided with the understanding that reciprocal receiving (or transmitting) embodiments are also contemplated. Similarly, it is understood that a system may operate as only a transmitter, only a receiver, simultaneously as a transmitter and receiver, with a time-multiplexed transmitter/receiver, with a frequency-multiplexed transmitter/receiver, with the first metasurface acting as a transmitter and a second metasurface acting as a receiver, or other transmit/receive configuration or operation technique.

The presently described embodiments support optical bandwidths and are therefore suitable for LiDAR and other optical-based sensing systems. Specifically, the systems and methods described herein operate in the sub-infrared, mid-infrared, high-infrared, and/or visible-frequency ranges (generally referred to herein as "optical"). Given the feature sizes needed for sub-wavelength optical resonant antennas and antenna spacings, the described metasurfaces may be manufactured using micro-lithographic and/or nano-lithographic processes, such as fabrication methods commonly used to manufacture complementary metal-oxide-semiconductor (CMOS) integrated circuits.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components, or modules to perform subtasks of those described herein. Any of the embodiments described herein may be combined with any combination of other embodiments described herein. The various permutations and combinations of embodiments are contemplated to the extent that they do not contradict one another.

As used herein, a computing device, system, subsystem, module, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), a programmable logic device (PLD), field-programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented or enhanced using hardware, software, firmware, or a combination thereof.

The components of some of the disclosed embodiments are described and illustrated in the figures herein to provide specific examples. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. As previously noted, descriptions and variations described in terms of transmitters are equally applicable to receivers, and vice versa.

FIG. 1A illustrates an example of a tunable liquid crystal (LCM) metasurface 100, according to one embodiment. The tunable liquid crystal metasurface (LCM) 100 can, for example, be used as part of a solid-state optical transmitter system, receiver system, or transceiver system. As illustrated, the tunable LCM 100 includes an optically reflective substrate 190 and a dielectric layer 195. A plurality of elongated rails 191 are arranged at sub-wavelength intervals on the optically reflective substrate 190 and electrically separated by the dielectric layer 195. The elongated rails 191 are referred to herein as "resonator rails" because the gaps between them (filled with liquid crystals or other dielectrics that can be tuned to adjust a refractive index) are resonant within the optical operational bandwidth of the LCM metasurface. Liquid crystal or another refractive index tunable dielectric material 193 is positioned between the elongated rails 191. A controller (not illustrated) may apply voltage differential bias patterns to the elongated rails 191 to modify a reflection phase of the resonator. The combination of phase delays imparted from all the resonators creates constructive interference in the desired beam steering direction.

Figure 1B:
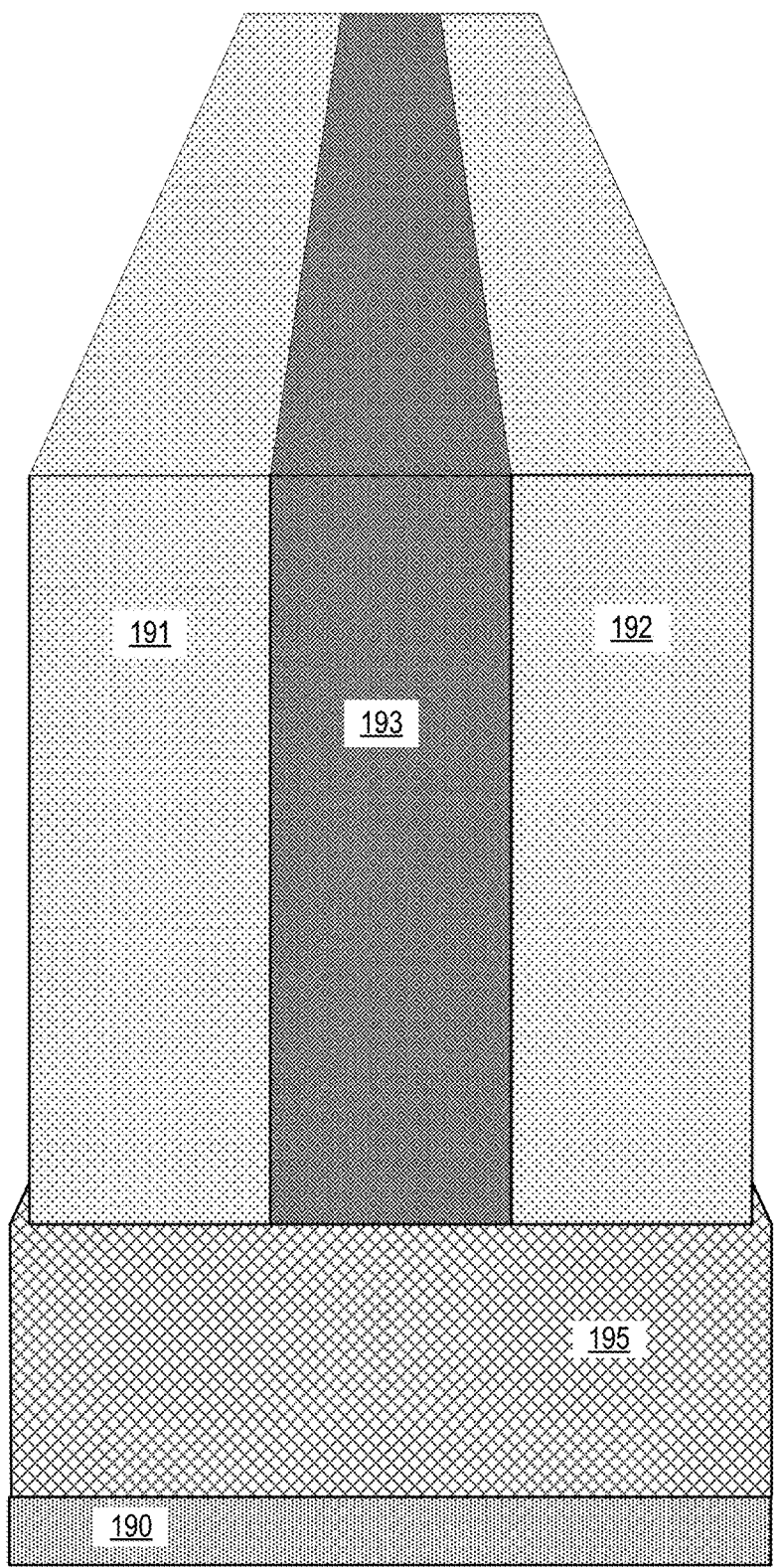
FIG. 1B illustrates a close-up view of liquid crystal positioned between two, parallel elongated resonator rails of a tunable LCM, according to one embodiment.

FIG. 1B illustrates a close-up view of liquid crystal 193 positioned between two, parallel elongated resonator rails 191 and 192, according to one embodiment. As illustrated, the elongated resonator rails 191 and 192 extend from a reflective surface 190 and are electrically isolated from the reflective surface 190 via a dielectric layer 195.

Additional description, variations, functionalities, and usages for optical metasurfaces are described in U.S. Pat. No. 10,451,800 granted on Oct. 22, 2019, entitled "Plasmonic Surface-Scattering Elements and Metasurfaces for Optical Beam Steering;" U.S. Pat. No. 10,665,953 granted on May 26, 2020, entitled "Tunable Liquid Crystal Metasurfaces;" and U.S. Pat. No. 11,092,675 granted on Aug. 17, 2021, entitled "Lidar Systems based on Tunable Optical Metasurfaces," each of which is hereby incorporated by reference in its entirety. Many of the metasurfaces described in the above-identified U.S. patents include parallel rails positioned above a two-dimensional or planar reflective surface or layer.

Figures 2A, 2B:
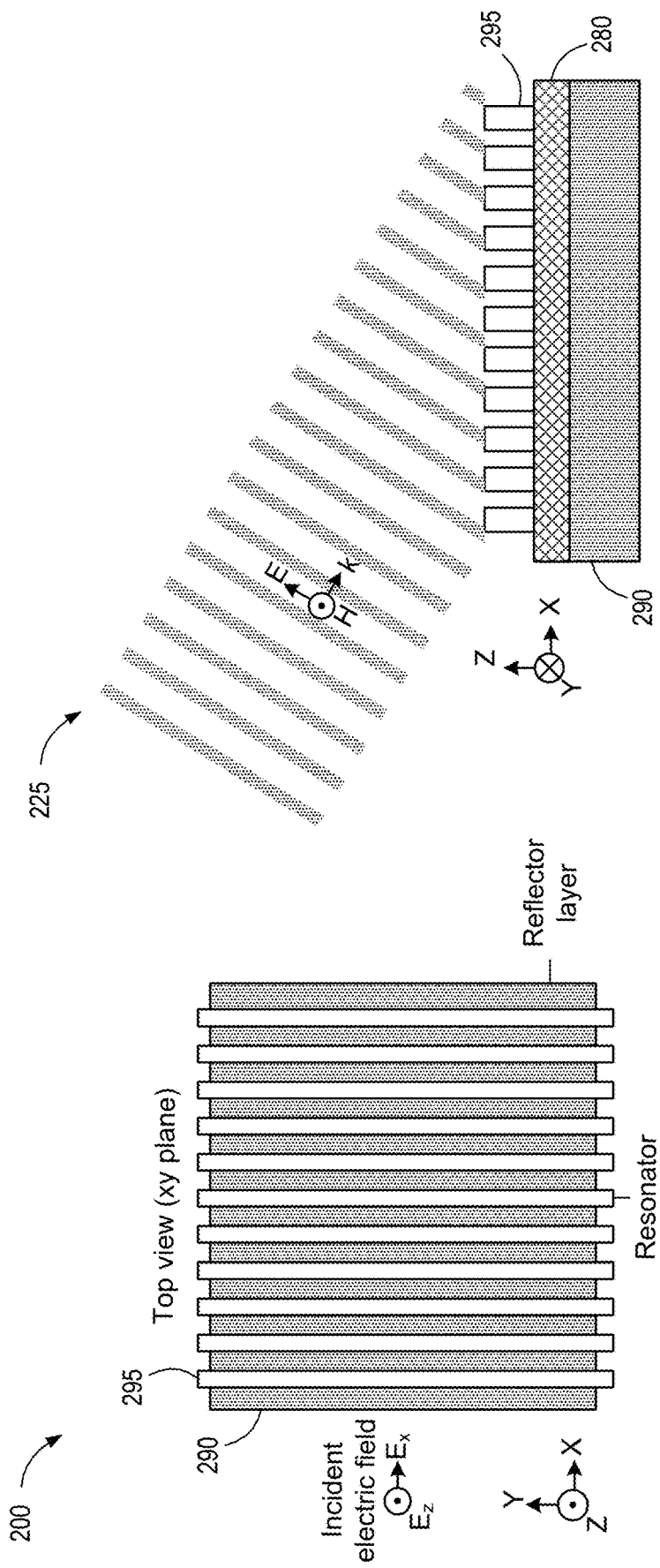
FIG. 2A illustrates a top view of parallel resonator rails arranged on a planar reflector surface, according to one embodiment.
FIG. 2B illustrates an optical wavefront incident on the resonator rails arranged on the planar reflector surface, according to one embodiment.

FIG. 2A illustrates a top view of parallel resonator rails 295 (shown as white rails) arranged on a planar reflector surface 290 of an LCM 200, according to one embodiment. In the illustrated embodiment, the optically reflective backplane is a planar reflector surface 290, such as a copper or aluminum layer.

FIG. 2B illustrates an optical wavefront 225 incident on the resonator rails 295 arranged on the planar reflector surface 290, according to one embodiment. As illustrated, a dielectric layer 280 electrically isolates the resonator rails 295 from the planar reflector surface 290. A controller may apply a voltage bias pattern to the resonator rails 295 to attain a target reflection pattern of the incident optical wavefront 225. With the planar reflector surface 290, electrical connections from each rail (or each subset of rails) may be made from the edges of the LCM or through insulated holes formed in the planar reflector surface 290. Routing electrical connections through the planar reflector surface 290 may be difficult and/or result in unintentional shorts between electrical connections and the entire planar reflector surface 290.

Figure 3B:
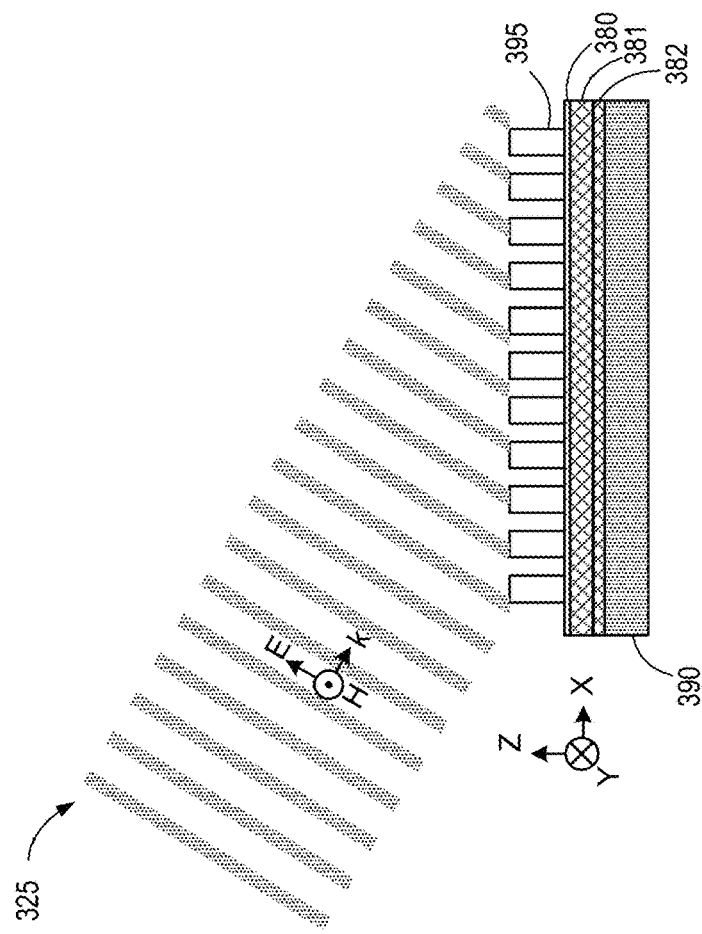
FIG. 3B illustrates an optical wavefront incident on the resonator rails and parallel to the cross-backplane reflector, according to one embodiment.
Figure 3A:
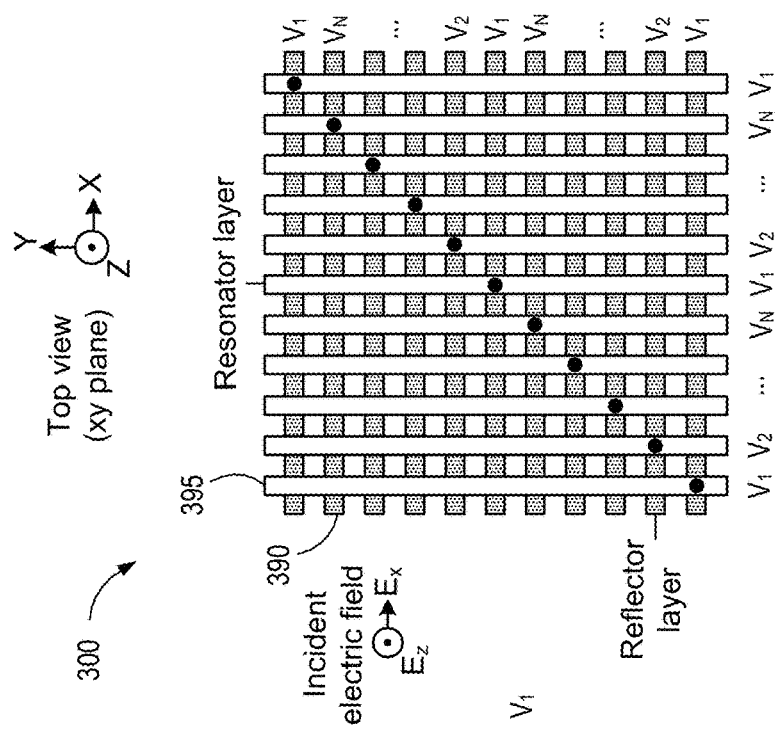
FIG. 3A illustrates a top view of parallel resonator rails arranged on a cross-backplane reflector, according to one embodiment.

FIG. 3A illustrates a top view of an LCM 300 with parallel resonator rails 395 arranged on a cross-backplane reflector 390 that is formed as a plurality of optically reflective rails extending perpendicular to the direction of the parallel resonator rails 395, according to one embodiment.

FIG. 3B illustrates an optical wavefront 325 incident on the resonator rails 395 and parallel to the cross-backplane reflector 390, according to one embodiment. In the illustrated embodiment, the resonator rails 395 are insulated from the underlying optical reflectors by insulating layers 380, 381, and 382. Insulating layers 380, 381, and 382 may be a single insulating layer or multiple insulating layers (e.g., combined as one or two layers instead of the illustrated three layers). Optical radiation incident on the LCM that is perpendicular to the parallel elongated optical reflectors forming the cross-backplane reflector 390 is reflected in the same manner as if the optically reflective backplane were a solid layer. As described herein, the elongated optical reflectors or the spaces between the elongated optical reflectors can be used to route electrical connections between a controller and the resonator rails 395.

As described herein, a plurality of vias may be patterned in the optically transmissive dielectric insulating layers 380, 381, and 382 at locations between adjacent optical reflectors in the cross-backplane reflector 390 (e.g., for wire routing between the elongated optical reflectors of the cross-backplane reflector 390 to the resonator rails 395). Alternatively, vias may be patterns in the optically transmissive dielectric insulating layers 380, 381, and 382 at locations directly above the optical reflectors in the cross-backplane reflector 390 (e.g., for embodiments in which elongated optical reflectors serve to electrically connect a controller to the resonator rails 395).

As described herein, a controller may apply a voltage to each of the resonator rails 395 via electrical connections therebetween. In some embodiments, the electrical connections may comprise wires, traces, or other conductive elements that extend from the resonator rails 395 through vias in the optically transmissive dielectric insulating layers 380, 381, and 382 and then between adjacent elongated optical reflectors of the cross-backplane reflector to the controller (or a connected control layer or printed circuit board (PCB) layer.

In other embodiments, each resonator rail 395 may be connected to one or more of the elongated optical reflectors of the cross-backplane reflector 390 through vias in the optically transmissive dielectric insulating layers 380, 381, and 382. In such embodiments, the controller may apply a voltage differential pattern to the resonator rails 395 by applying a corresponding voltage to the electrically connected elongated optical reflectors of the cross-backplane reflector. As described herein, a controller may selectively apply patterns of voltage differentials between adjacent resonator rails 395 to generate corresponding reflection phase patterns for selective beam steering of the incident optical radiation 325.

FIG. 3C illustrates a top view of the parallel resonator rails 395 of the LCM 300 arranged on the cross-backplane reflector similar to that of FIG. 3A, according to one embodiment. The LCM 300 in FIG. 3C is the same LCM 300 illustrated in FIG. 3A, but the view is rotated 90 degrees to facilitate visualization of FIG. 3D FIG. 3D illustrates another side view of the parallel, elongated optical reflectors of the cross-backplane reflector 390, according to one embodiment. As illustrated in the side view of the LCM 300, a single "end" resonator rail 395 is visible and electrically isolated from the elongated optical reflectors of the cross-backplane reflector 390 by insulating layers 380, 381, and 382. Examples of suitable resonator rails 395 include dielectric rails, doped silicon rails, metal rails, and combinations thereof. Examples of suitable metal rails include but are not limited to, metal rails comprising one or more of aluminum, gold, copper, silver, platinum, titanium, and chromium. Similarly, the elongated optical reflectors of the cross-backplane reflector 390 may comprise or consist of one or more of aluminum, gold, copper, silver, platinum, titanium, and chromium. The resonator rails 395 may be spaced apart from one another by less than one-half of a wavelength within an operational bandwidth. Similarly, the elongated optical reflectors of the cross-backplane reflector 390 may also be spaced from one another by less than one-half of a wavelength within the operational bandwidth.

Figure 4A:
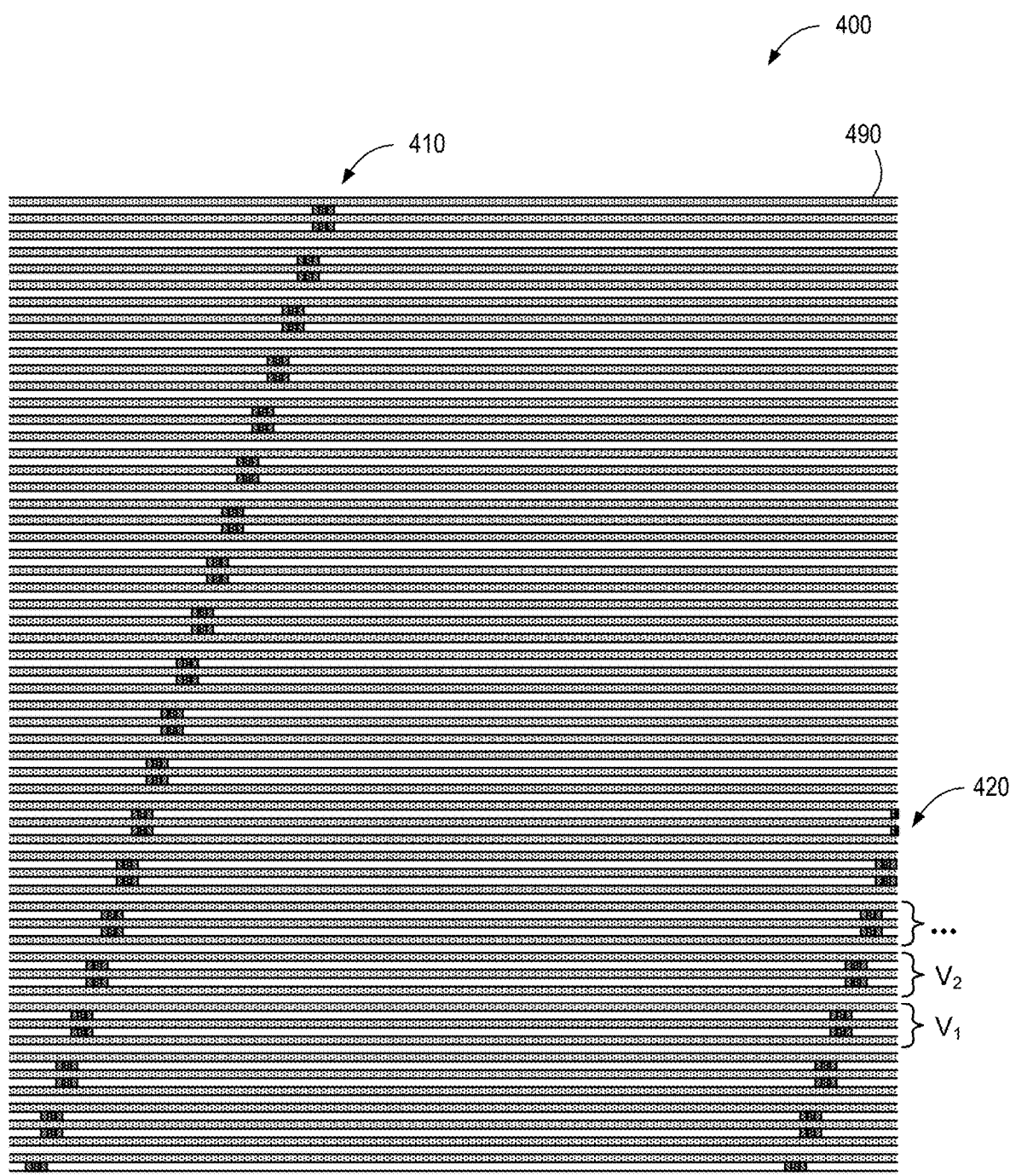
FIG. 4A illustrates a layout diagram of a cross-backplane reflector layer with a mid-array via layout layer with vias between the optical reflector bars, according to one embodiment.

FIG. 4A illustrates a layout diagram of a cross-backplane reflector layer 400 with a mid-array via layout layer of vias 410 and 420 between the optical reflectors 490, according to one embodiment. As illustrated, the vias 410 and 420 are arranged within the active reflective region of the cross-backplane reflector layer 400 in parallel diagonals. Each via 410 and 420 may facilitate the electrical connection of a resonator rail to a corresponding elongated optical reflector 490. A controller may apply voltages V1, V2, V3, etc. (as illustrated) to groups of one or more of the elongated optical reflectors 490, in which voltages are communicated to corresponding resonator rails through the vias 410 and 420.

The elongated optical reflectors 490 serve two purposes in the illustrated embodiment. First, the elongated optical reflectors 490 form the cross-backplane reflector layer 400 of the LCM to reflect optical radiation that this incident thereon (perpendicular thereto for maximum reflective efficiency, but possibly off-axis in some embodiments for slightly diminished reflective efficiency). Second, the optical reflectors 490 supply voltage from the controller to the resonator rails through the vias 410 and 420.

Figure 4B:
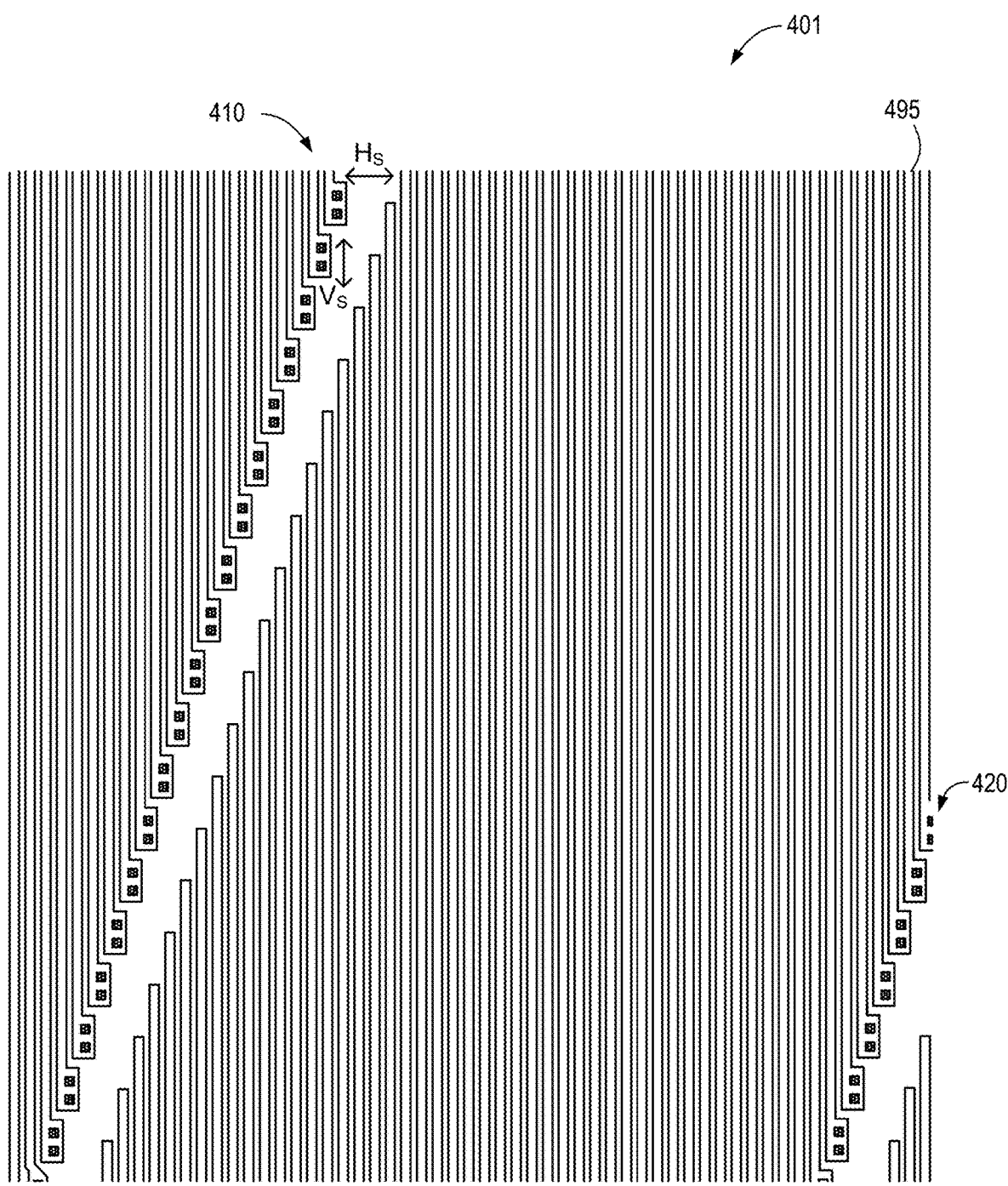
FIG. 4B illustrates a layout diagram of the resonator rails in the resonator layer of the mid-array layout of FIG. 4A, according to one embodiment.

FIG. 4B illustrates a layout diagram of the resonator rails 495 in the resonator layer 401 of the mid-array layout of FIG. 4A, according to one embodiment. As illustrated, the plurality of vias 410 and 420 are aligned to connect each of the resonator rails 495 to a distinct elongated optical resonator in the lower layer. In the illustrated embodiment, each resonator rail 495 is associated with two vias to provide redundancy in the electrical connection to the underlying elongated optical resonator layer. The illustrated layout is referred to as a mid-array layout of vias 410 and 420 in a flag-stripe pattern within the optically active region of the LCM. The illustration is exaggerated in size and shown with modified relative spacing to facilitate visualization. In one example embodiment, the horizontal spacing ($H_s$) between resonator rails 495 on opposite sides of the flag stripe of vias is approximately 300 micrometers, while the vertical spacing ($V_s$) may be approximately 1,200 micrometers.

Figure 4C:
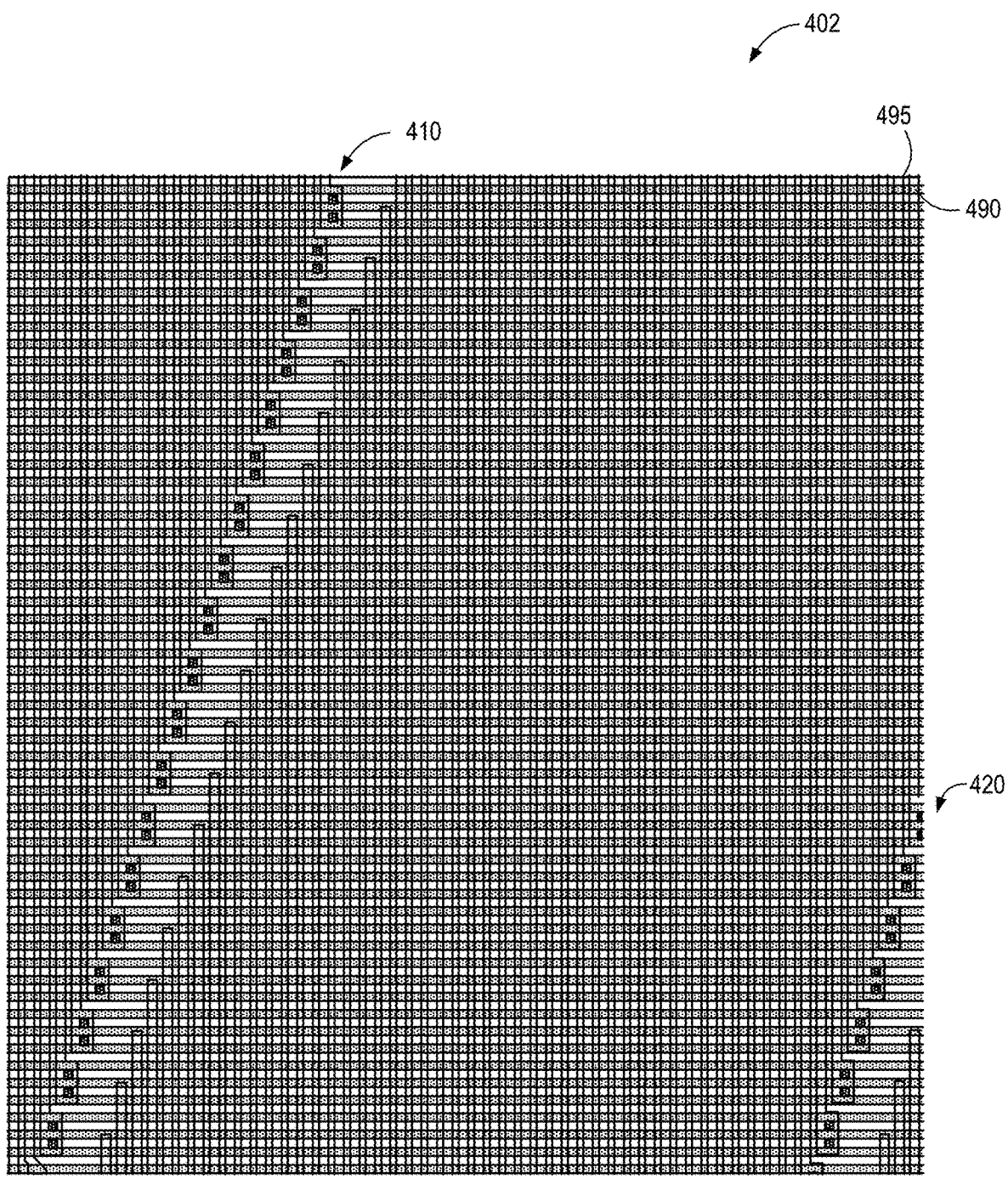
FIG. 4C illustrates a layout diagram of a portion of the mid-array LCM that includes a resonator layer, via layout layer, and a cross-backplane reflector layer, according to one embodiment.

FIG. 4C illustrates a layout diagram of a portion of the mid-array LCM 402 that includes a resonator layer of resonator rails 495, via layout layer of vias 410 and 420, and a cross-backplane reflector layer of elongated optical reflectors 490, according to one embodiment.

Figures 5A, 5B, 5C:
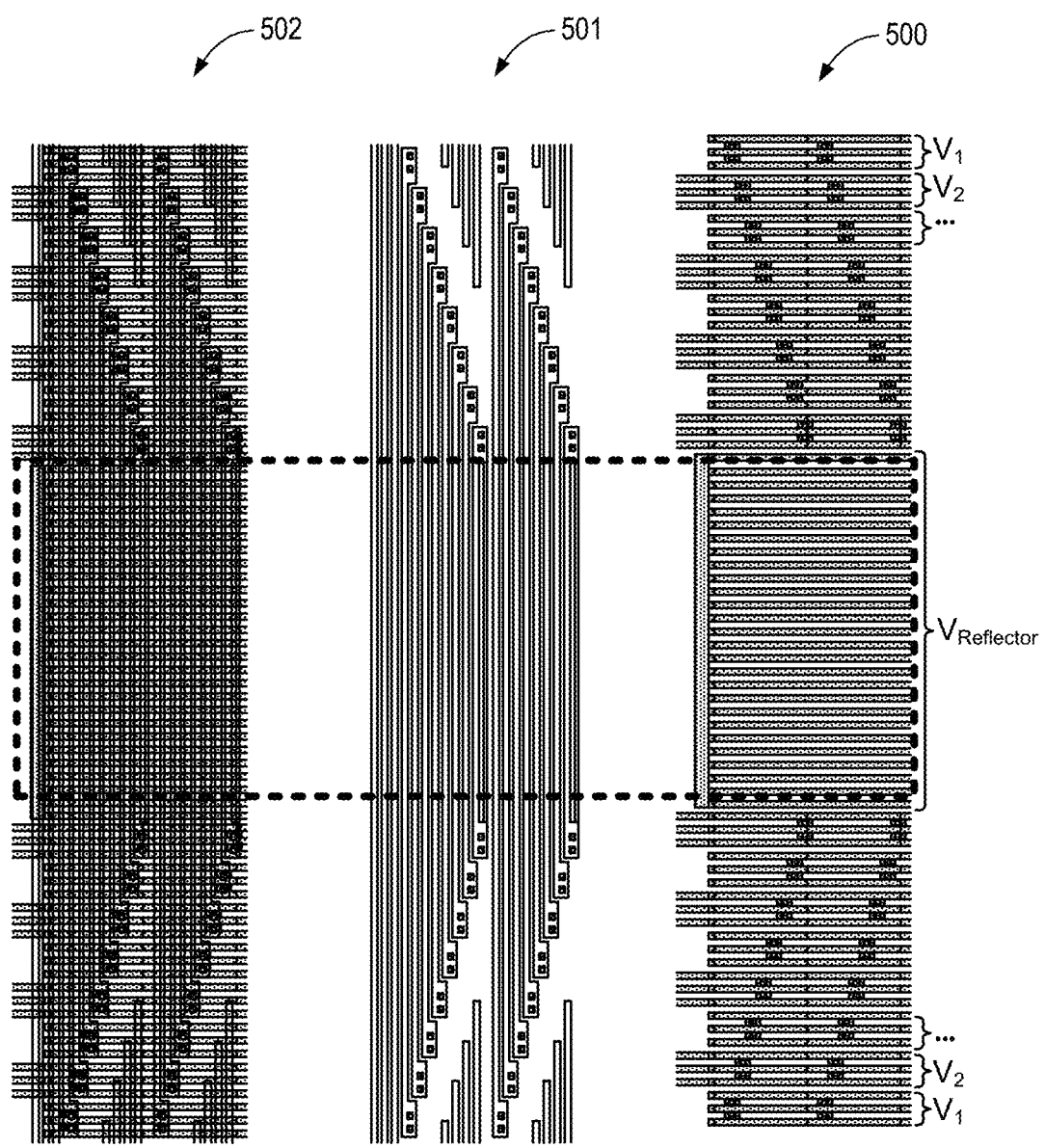
FIG. 5A illustrates an alternative layout diagram of a portion of an LCM using edge routing, according to one embodiment.
FIG. 5B illustrates the layout diagram of the vias and the resonator layer of the portion of the edge-routed LCM in FIG. 5A, according to one embodiment.
FIG. 5C illustrates the layout diagram of the vias and the reflector layer of the portion of the edge-routed LCM in FIG. 5A, according to one embodiment.

FIG. 5A illustrates an alternative layout diagram 502 of a portion of an LCM using edge routing, according to one embodiment. The illustrated diagram 502 includes a cross-backplane reflector layer of elongated optical reflectors and resonator rails. The dashed rectangle identifies the active region of the LCM and, notably, the vias are formed outside of the active region of the LCM within a routing region of the LCM. The illustrated embodiment is dually connected via vias within upper and lower routing regions of the LCM on either side of the active region of the LCM.

FIG. 5B illustrates the layout diagram 501 of the vias and the resonator layer of the portion of the edge-routed LCM in FIG. 5A, according to one embodiment. In edge-array routing configurations, an optically reflective surface or layer beneath the resonator rails may be formed as a single two-dimensional surface (e.g., a sheet or layer of metal), as a cross-backplane reflector of optical reflectors (as illustrated), or as a distributed Bragg reflector (DBR) that includes a plurality of layers of dielectrics with different indices of refraction.

FIG. 5C illustrates the layout diagram 500 of the vias and the reflector layer of the portion of the edge-routed LCM in FIG. 5A, according to one embodiment. The tunable LCM utilizing a cross-backplane reflector with vias outside of the active region is referred to as "edge-array routing." In edge-array routing configurations, the elongated resonator rails are arranged parallel to one another and extend from a first edge of the active area to a second edge of the active area, and beyond the second edge of the active area into a first routing area that is outside of the active area. A cross-backplane conductor (which may or may not be "reflective" may include a plurality of elongated conductors (possibly, but not necessarily, elongated optical reflectors) that extend parallel to one another and perpendicular to the resonator rails.

In some edge-array routing configurations, as illustrated and described in greater detail below, each resonator rail further extends beyond the first edge of the active area into a second routing area that is outside of the active area. A second cross-backplane conductor within the second routing area may include a second plurality of elongated conductors extending parallel to one another and perpendicular to the resonator rails.

Figure 6A:
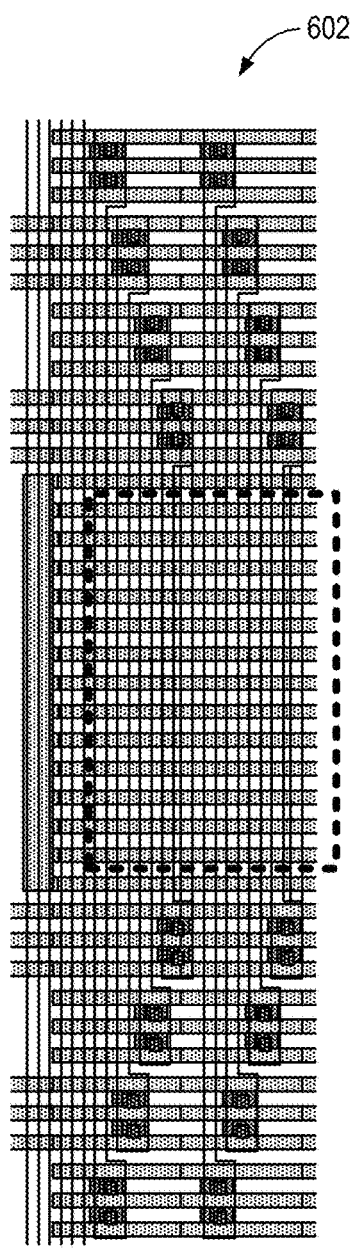
FIG. 6A illustrates a layout diagram of a portion of an LCM using an alternative edge routing layout, according to one embodiment.

FIG. 6A illustrates a layout diagram 602 of a portion of an LCM using an alternative edge routing layout, according to one embodiment.

Figure 6B:
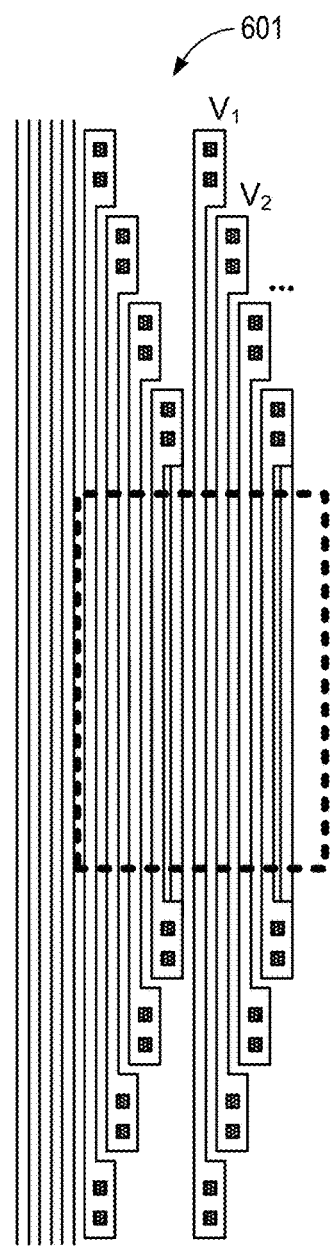
FIG. 6B illustrates the layout diagram of the vias and the resonator layer of the portion of the edge-routed LCM in FIG. 6A, according to one embodiment.

FIG. 6B illustrates the layout diagram 601 of the vias and the resonator layer of the portion of the edge-routed LCM in FIG. 6A, according to one embodiment.

Figure 6C:
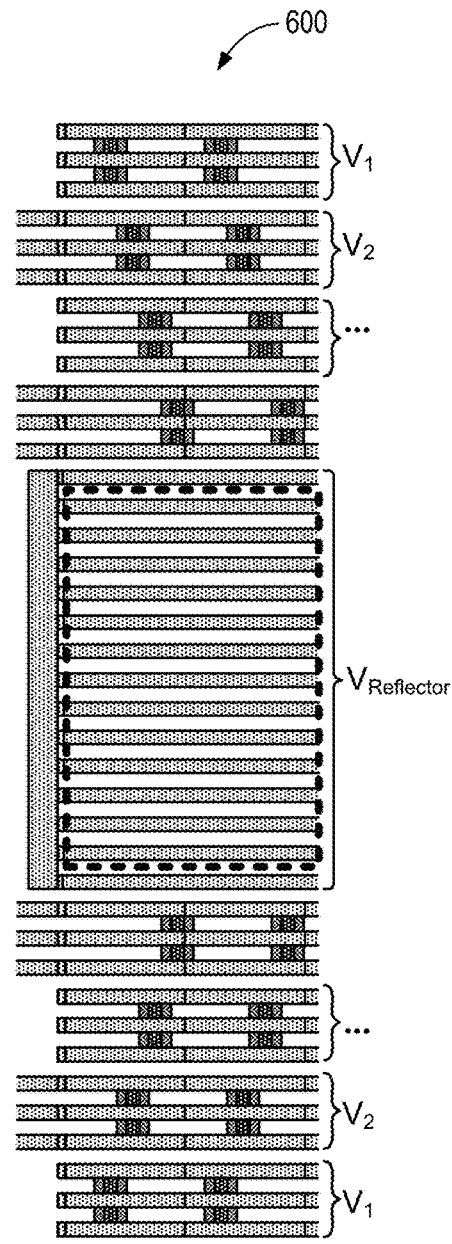
FIG. 6C illustrates the layout diagram of the vias and the reflector layer of the portion of the edge-routed LCM in FIG. 6A, according to one embodiment.

FIG. 6C illustrates the layout diagram 600 of the vias and the reflector layer of the portion of the edge-routed LCM in FIG. 6A, according to one embodiment.

Figure 7A:
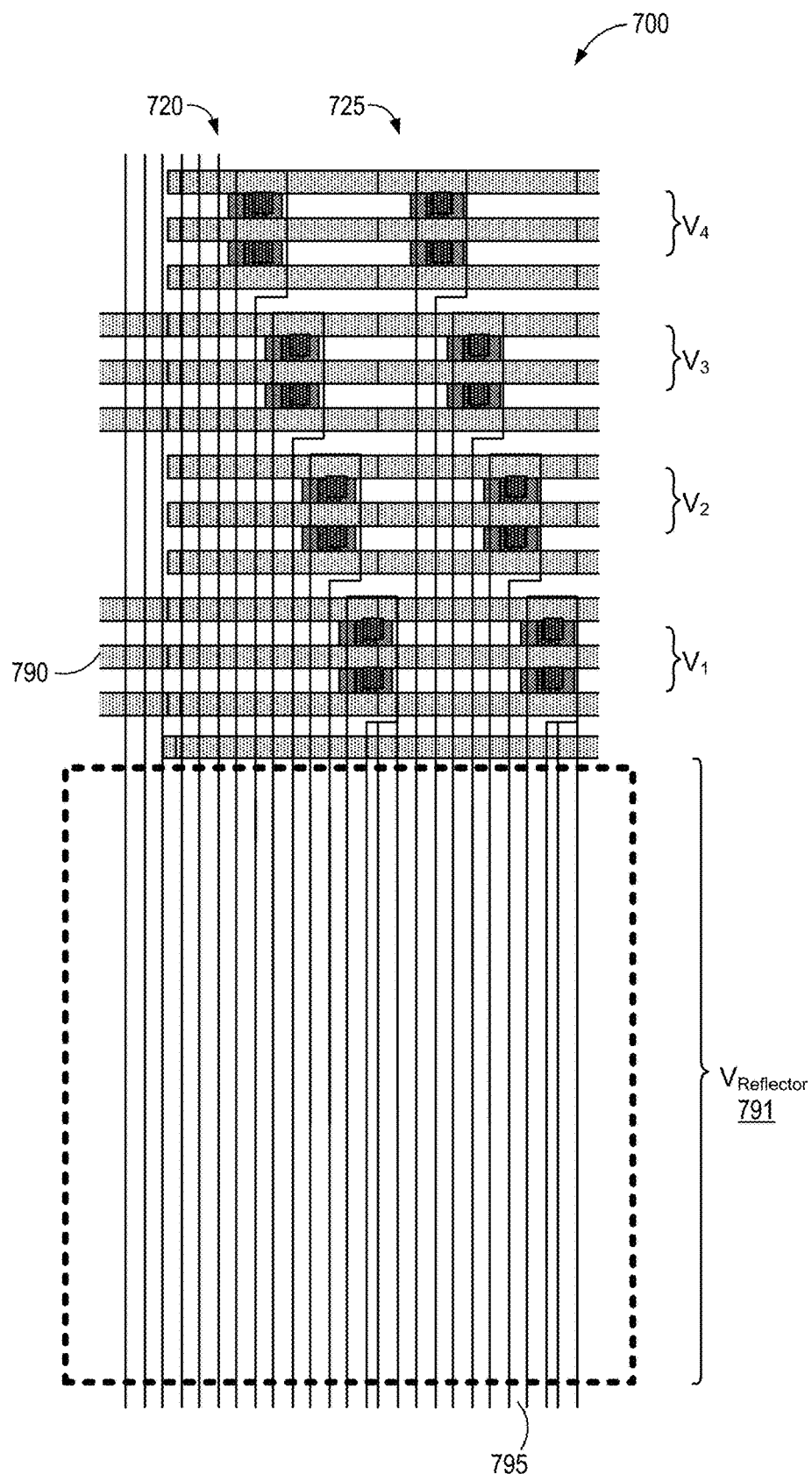
FIG. 7A illustrates a layout diagram of a portion of an LCM using an alternative single-side edge routing layout, according to one embodiment.

FIG. 7A illustrates a layout diagram 700 of a portion of an LCM using an alternative single-side edge routing layout, according to one embodiment. As illustrated, the resonator rails 795 extend beyond the active region 791 into a routing region of the LCM. The elongated optical reflectors 790 extend perpendicular to the resonator rails 795 within the routing region of the LCM to provide for edge applied voltages V1-V4 from a controller to each of the resonator rails 795 using the vias 720 and 725 formed through an insulating layer separating the resonator rails 795 from the elongated optical reflectors of the cross-backplane optical reflector layer.

Figure 7B:
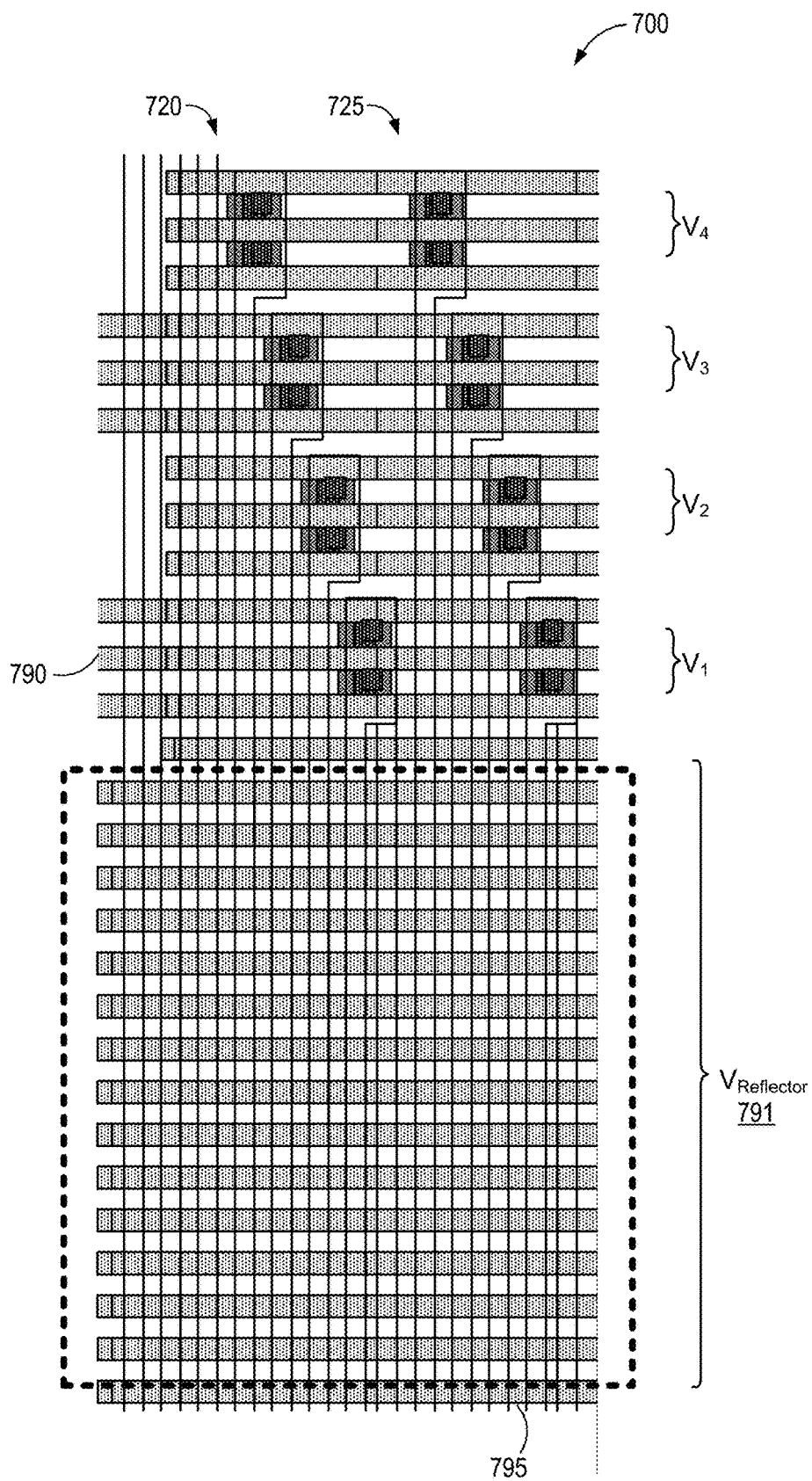
FIG. 7B illustrates a layout diagram of a portion of an LCM with a cross-backplane reflector layer, according to one embodiment.

FIG. 7B illustrates a layout diagram 701 of a portion of the LCM in FIG. 7A with a cross-backplane reflector layer of elongated optical reflectors within the active region 791, according to one embodiment.

Figure 7C:
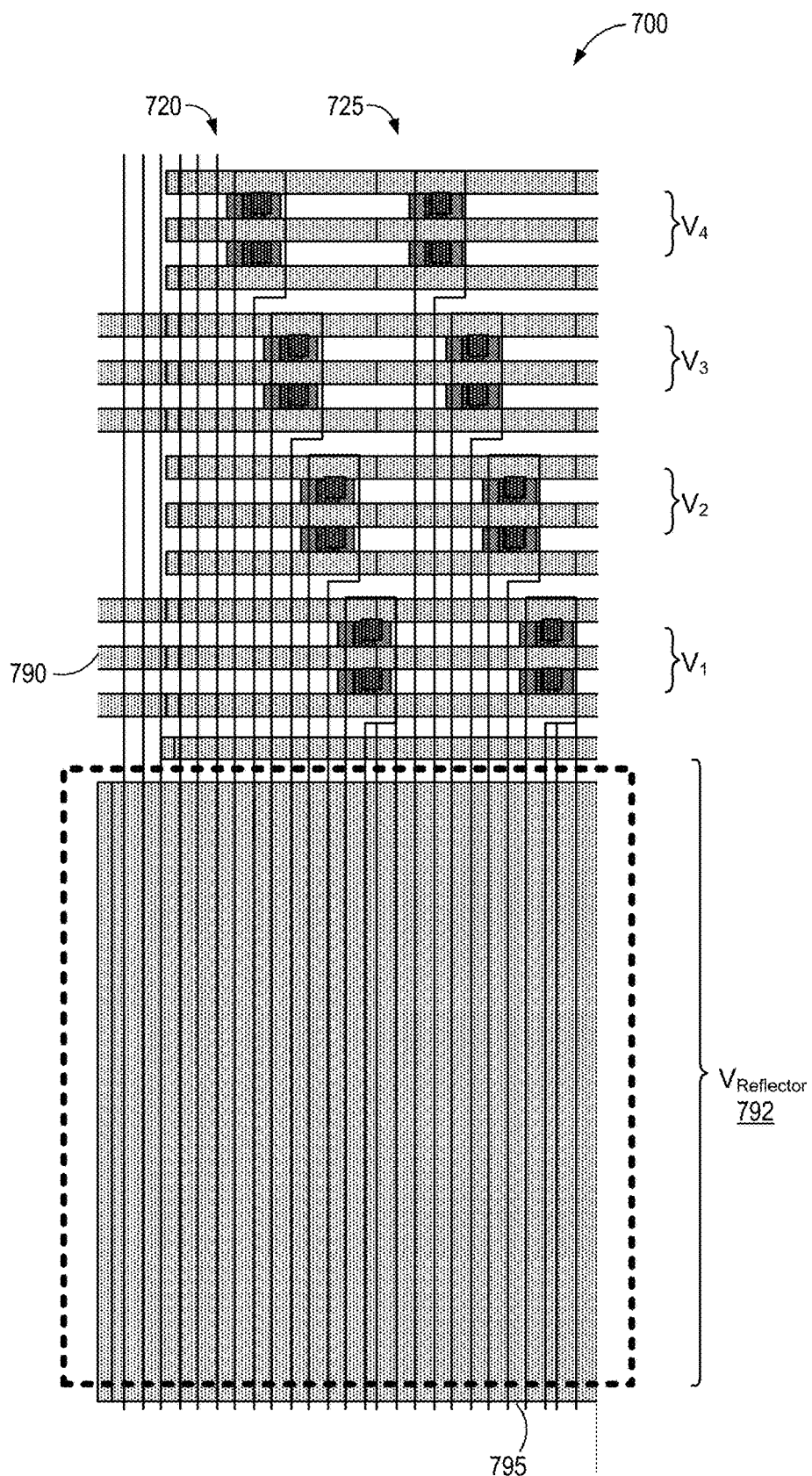
FIG. 7C illustrates a layout diagram of a portion of an LCM with a cross-backplane for single-side edge routing and a solid reflector in the active region, according to one embodiment.

FIG. 7C illustrates a layout diagram 702 of a portion of an LCM with a cross-backplane for single-side edge routing and a solid reflector in the active region 792, according to one embodiment. Again, in edge-array routing configurations, such as the configuration shown in FIGS. 7A-7C an optically reflective surface or layer beneath the resonator rails in the active region 792 may be formed as a single two-dimensional surface (e.g., a sheet or layer of metal), as shown in FIG. 7C, as a cross-backplane reflector of optical reflectors, as shown in FIG. 7B, or as a distributed Bragg reflector (DBR) (not shown) that includes a plurality of layers of dielectrics with different indices of refraction.

FIG. 8A illustrates an example of an optically reflective metasurface 800 with a reflective surface 880, such as a metal reflector or a dielectric reflector. The reflective surface 880 has an insulating layer (not shown) to provide electrical insulation from the resonator rails 895. Each of the resonator rails 895 is illustrated with an optional electrically insulating layer 896 (FIG. 8B). In some embodiments, the electrically insulating layer 896 may also cove the tops of each of the resonator rails 895.

FIG. 8B illustrates a specific embodiment of a tunable optical resonant antenna comprising two adjacent resonator rails 891 and 892 extending from an optically reflective copper surface 890. The resonator rails 891 and 892 extend vertically from the optically reflective surface 890 but are electrically insulated therefrom by a layer of oxide or other dielectric material 880. An insulating layer 896 (e.g., silicon nitride or another electrically insulating layer) covers each of the copper resonator rails 891 and 892. Liquid crystal 893 is deposited within a gap between the adjacent copper resonator rails 891 and 892. A voltage controller 810 applies a voltage to the copper resonator rails 891 and 892. The reflection phase associated with the liquid crystal 893 is tunable based on the voltage differential between the copper resonator rails 891 and 892 generated by the voltage controller 810.

FIG. 8C illustrates the optical field region with two resonant nodes 815 and 816 associated with adjacent copper resonator rails 891 and 892 extending from the oxide layer 880 on the optically reflective surface 890, according to one embodiment. An electric field applied by the voltage controller 810 tunes the optical resonant antenna by modifying the index of refraction of the liquid crystal 893 applied on, around, and/or between the copper resonator rails 891 and 892.

Figure 9A:
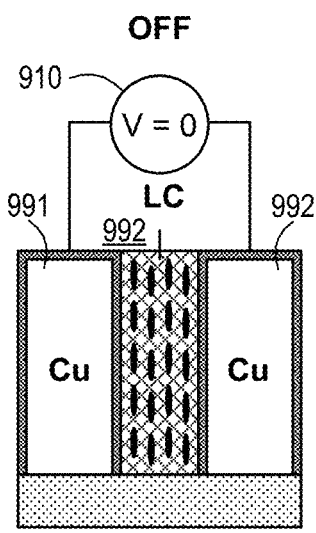
FIG. 9A illustrates the liquid crystal between two metal rails aligned in a first direction to provide a first refractive index without any applied voltage, according to one embodiment.

FIG. 9A illustrates the liquid crystal 992 between two metal rails 991 and 992, according to one embodiment. As illustrated, the liquid crystal is aligned in a first direction corresponding to a first refractive index without voltage applied by the voltage controller 910.

Figure 9B:
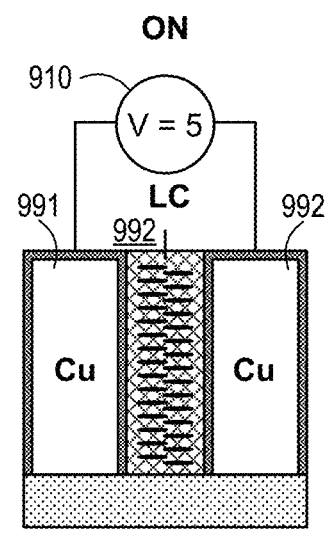
FIG. 9B illustrates the liquid crystal between the two metal rails aligned in a second direction to provide a second refractive index with an applied voltage of 5 volts, according to one embodiment.

FIG. 9B illustrates the liquid crystal 992 between the two metal rails 991 and 992 aligned in a second direction that results in a second refractive index based on the applied voltage of 5 volts, according to one embodiment.

Figure 9C:
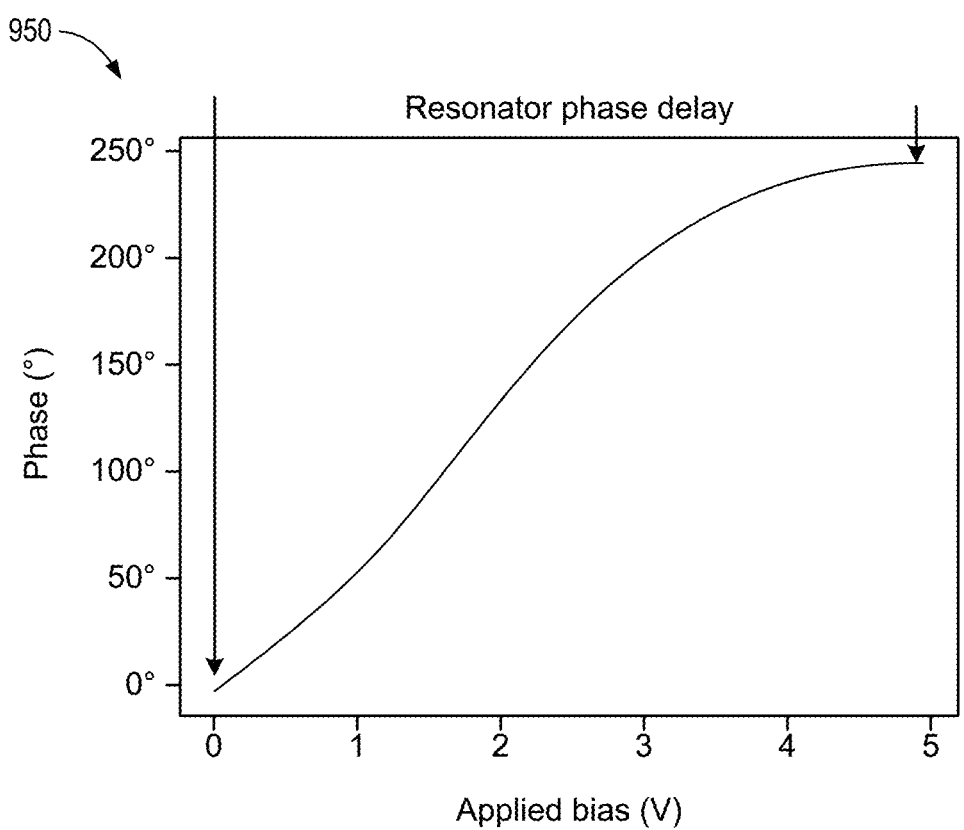
FIG. 9C illustrates a graph of a phase response of an LCM unit cell with respect to applied voltage values, according to one embodiment.

FIG. 9C illustrates a graph 950 of a phase response of an LCM unit cell with respect to applied voltage values, according to one embodiment.

Figure 10A:
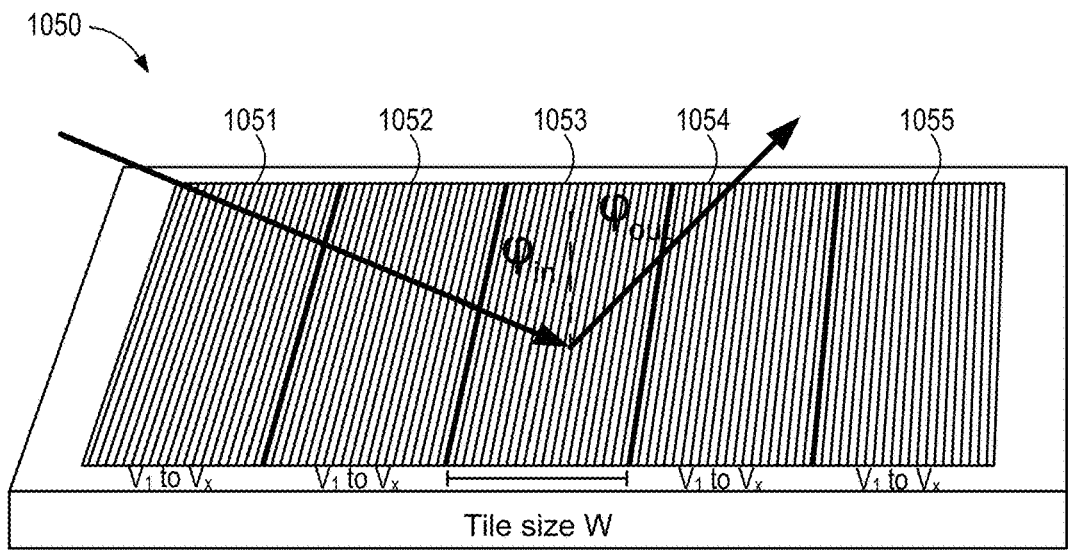
FIG. 10A illustrates an example diagram of a tiled LCM where each tile includes a plurality of rails, according to one embodiment.

FIG. 10A illustrates an example diagram of a tiled LCM 1050 where each tile includes a plurality of rails, according to one embodiment. The simplified diagram includes three subsets of reflector rails or "tiles" 1051, 1052, 1053, 1054, and 1055. Any number of tiles (tens, hundreds, thousands, etc.) may be used to form an LCM, and each tile may include any number of reflector rails therein. The same voltage pattern $V_1$ to $V_x$ may be applied to the resonator rails of each tile 1051-1055 during operation to attain a target reflection pattern.

Figure 10B:
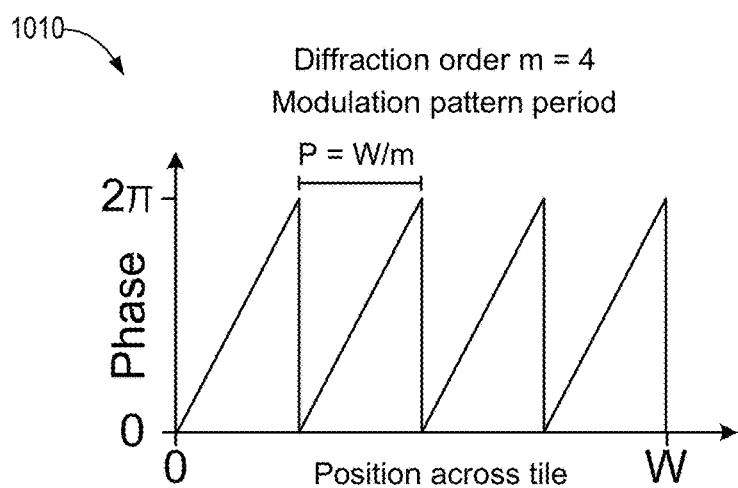
FIG. 10B illustrates a graph of a phase response with respect to position on a tile of a plurality of rails of an LCM with a diffraction order of 4, according to one embodiment.

FIG. 10B illustrates a graph 1010 of a phase response with respect to position on a tile of a plurality of rails of an LCM with a diffraction order of 4, according to one embodiment. As illustrated, the phase response at each location along the tile varies between 0 and $2\pi$ over a distance corresponding to the selected diffraction order.

Figure 10C:
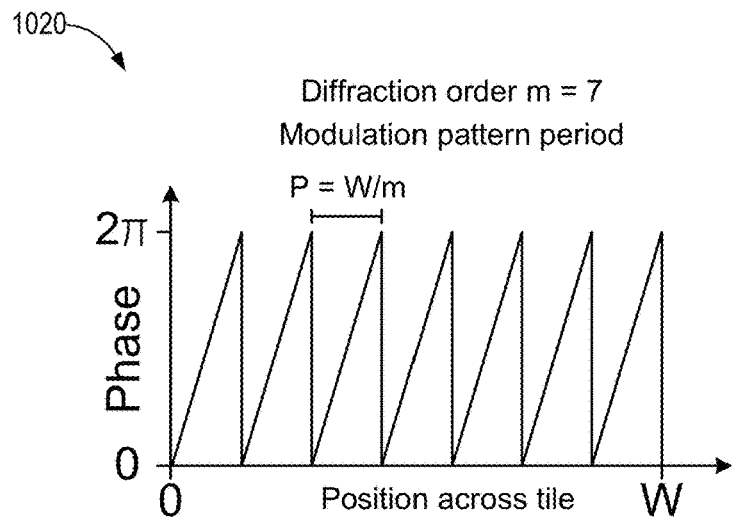
FIG. 10C illustrates a graph of another phase response with respect to position on a tile of a plurality of rails of an LCM with a diffraction order of 7, according to one embodiment.

FIG. 10C illustrates a graph 1020 of another phase response with respect to position on a tile of a plurality of rails of an LCM with a diffraction order of 7, according to one embodiment. The higher diffraction order results in larger changes in phase over shorter distances as compared to the LCM with a diffraction order of 4.

Figure 11:
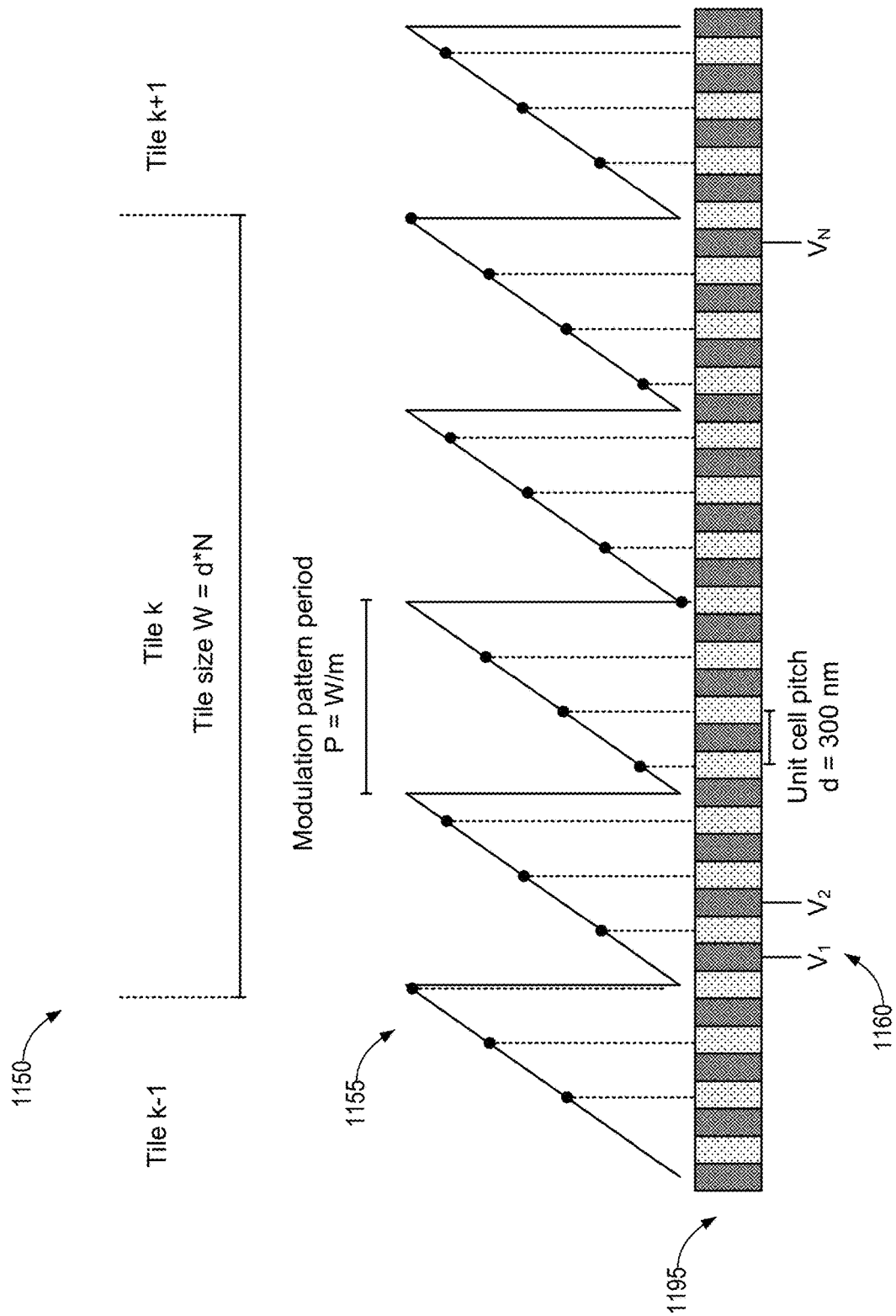
FIG. 11 illustrates an example diagram of a plurality of rails forming a single tile of a multi-tile LCM, according to one embodiment.

FIG. 11 illustrates an example diagram of a plurality of resonator rails 1195 forming a single tile 1150 of a multi-tile LCM, according to one embodiment. As illustrated, voltages $V_1, V_2, \ldots V_N$ may be applied to the resonator rails 1195 to generate a modulation pattern period, P, that is a function of the tile size divided by the diffraction order. The tile size, W, is a function of the on-center spacing or distance, d, between the resonator rails (illustrated as an example 300 nanometers) multiplied by the total number of rails in each tile (e.g., 10, 100, 10,000, 100,000, or more).

The presently described systems and methods, including those relating to cross-backplane reflectors, edge-routing of vias, and mid-array routing of vias, can be used in conjunction with and better understood in the context of the embodiments described in the following U.S. Patent Applications, each of which is hereby incorporated by reference in its entirety: U.S. patent application Ser. No. 16/357,288 titled "Tunable Liquid Crystal Metasurfaces," filed on Mar. 18, 2019; U.S. patent application Ser. No. 15/924,744 titled "Plasmonic Surface-Scattering Elements and Metasurfaces for Optical Beam Steering," filed on Mar. 19, 2018, and U.S. patent application Ser. No. 15/900,676 titled "Optical Surface-Scattering Elements and Metasurfaces," filed on Feb. 20, 2018.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims.

What is claimed is:

1. A tunable optical metasurface, comprising:
   an array of elongated resonator rails arranged parallel to one another on a first planar surface of an optically transmissive dielectric;
   a refractive index tunable dielectric material positioned within an optical field region between adjacent resonator rails; and
   a cross-backplane reflector on an opposing planar surface of the optically transmissive dielectric, the cross-backplane reflector comprising a plurality of elongated optical reflectors extending parallel to one another and perpendicular to the array of resonator rails.

2. The metasurface of claim 1, wherein the refractive index tunable dielectric material comprises at least one of: liquid crystal, an electro-optic polymer, and a chalcogenide glass.

3. The metasurface of claim 1, further comprising:
   a plurality of vias patterned in the optically transmissive dielectric at locations to electrically connect each resonator rail to at least one of the optical reflectors of the cross-backplane reflector.

4. The metasurface of claim 3, further comprising:
   a controller to selectively apply patterns of voltage differentials between adjacent resonator rails to generate corresponding reflection phase patterns for selective beam steering.

5. The metasurface of claim 1, wherein each elongated resonator rail comprises a metal rail.

6. The metasurface of claim 1, wherein each metal rail comprises at least one metal from a group of metals consisting of: aluminum, gold, copper, silver, platinum, titanium, chromium, molybdenum, cobalt, tungsten, tantalum, tantalum nitride and titanium nitride.

7. The metasurface of claim 1, wherein each resonator rail is spaced from an adjacent resonator rail by less than one-half of a wavelength within an operational bandwidth.

8. The metasurface of claim 1, wherein each optical reflector is spaced from an adjacent optical reflector by less than one-half of a wavelength within the operational bandwidth.

9. The metasurface of claim 1, wherein each optical reflector in the cross-backplane reflector comprises at least one metal from a group of metals consisting of: aluminum, gold, copper, silver, platinum, chromium, titanium, molybdenum, cobalt, and tungsten.

10. The metasurface of claim 1, wherein each optical reflector in the cross-backplane reflector is at least partially coated in a coating material comprising at least one of tantalum, tantalum nitride, and titanium nitride.

11. A tunable optical metasurface, comprising:
    a cross-backplane reflector comprising a plurality of elongated optical reflectors extending parallel to one another;
    an array of elongated resonator rails arranged parallel to one another and perpendicular to the optical reflectors of the cross-backplane reflector, wherein the array of resonator rails is electrically insulated from the optical reflectors of the cross-backplane reflector;
    a refractive index tunable dielectric material positioned within an optical field region between adjacent resonator rails; and
    a plurality of vias patterned within the array of resonator rails to electrically connect each resonator rail to at least one of the optical reflectors.

12. The metasurface of claim 11, wherein the refractive index tunable dielectric material comprises at least one of: liquid crystal, an electro-optic polymer, and a chalcogenide glass.

13. The metasurface of claim 11, wherein the array of resonator rails is electrically insulated from the optical reflectors of the cross-backplane reflector via a dielectric insulating layer.

14. The metasurface of claim 11, wherein the vias are patterned along a diagonal within the array to provide mid-array routing.

15. A tunable optical metasurface, comprising:
    a optical reflector within an active area to reflect optical radiation within an operational bandwidth
    an array of elongated resonator rails arranged parallel to one another and extending from a first edge of the active area to a second edge of the active area and beyond the second edge of the active area into a first routing area that is outside of the active area;
    a refractive index tunable dielectric material positioned within an optical field region between adjacent resonator rails; and
    a first cross-backplane conductor within the first routing area that comprises a first plurality of elongated conductors extending parallel to one another and perpendicular to the resonator rails.

16. The metasurface of claim 15, wherein the refractive index tunable dielectric material comprises at least one of: liquid crystal, an electro-optic polymer, and a chalcogenide glass.

17. The metasurface of claim 15, wherein the optical reflector within the active area comprises a distributed Bragg reflector (DBR) comprising a plurality of layers of dielectrics having varying indices of refraction.

18. The metasurface of claim 15, wherein the optical reflector within the active area comprises a metal reflector layer.

19. The metasurface of claim 18, wherein the metal reflector layer comprises at least one of copper and aluminum.

20. The metasurface of claim 15, wherein the optical reflector within the active area comprises a cross-backplane reflector with a plurality of elongated optical reflectors extending parallel to one another and perpendicular to the resonator rails within the active area.

21. The metasurface of claim 15, further comprising a plurality of vias within the first routing area to connect each resonator rail to at least one elongated conductor of the first cross-backplane conductor.

22. The metasurface of claim 15, wherein the first cross-backplane conductor comprises a cross-backplane reflector where each of the elongated conductors comprises an elongated optical reflector.

23. The metasurface of claim 15, wherein each resonator rail further extends beyond the first edge of the active area into a second routing area that is outside of the active area.

24. The metasurface of claim 23, further comprising:
a second cross-backplane conductor within the second routing area that comprises a second plurality of elongated conductors extending parallel to one another and perpendicular to the resonator rails.

25. The metasurface of claim 24, further comprising a second plurality of vias within the second routing area to connect each resonator rail to at least one elongated conductor of the second cross-backplane conductor in the second routing area, such that each resonator rail is connected to at least one elongated conductor in each of the first routing area and the second routing area.

26. The metasurface of claim 25, wherein the first cross-backplane conductor comprises a first cross-backplane reflector and wherein the second cross-backplane conductor comprises a second cross-backplane reflector, such that each of the elongated conductors comprises an elongated optical reflector.

27. The metasurface of claim 26, wherein the optical reflector within the active area comprises a third cross-backplane reflector with a plurality of elongated optical reflectors extending parallel to one another and perpendicular to the resonator rails within the active area.

* * * * *